US012246994B2

(12) United States Patent
Poteet et al.

(10) Patent No.: US 12,246,994 B2
(45) Date of Patent: Mar. 11, 2025

(54) HIGH TEMPERATURE OXIDATION PROTECTION FOR COMPOSITES

(71) Applicant: GOODRICH CORPORATION, Charlotte, NC (US)

(72) Inventors: Steven A. Poteet, Hamden, CT (US); Katherine Urena Pimentel, Manchester, CT (US); Philip Sheehan, Pueblo West, CO (US); John Weaver, Colorado Springs, CO (US)

(73) Assignee: GOODRICH CORPORATION, Charlotte, NC (US)

( * ) Notice: Subject to any disclaimer, the term of this patent is extended or adjusted under 35 U.S.C. 154(b) by 553 days.

(21) Appl. No.: 17/079,239

(22) Filed: Oct. 23, 2020

(65) Prior Publication Data

US 2021/0198159 A1 Jul. 1, 2021

Related U.S. Application Data

(60) Provisional application No. 62/954,113, filed on Dec. 27, 2019.

(51) Int. Cl.
C04B 41/50 (2006.01)
C04B 35/83 (2006.01)
C04B 41/00 (2006.01)
C04B 41/45 (2006.01)
C04B 41/89 (2006.01)

(52) U.S. Cl.
CPC .......... C04B 41/5058 (2013.01); C04B 35/83 (2013.01); C04B 41/0072 (2013.01); C04B 41/009 (2013.01); C04B 41/4535 (2013.01); C04B 41/4584 (2013.01); C04B 41/5023 (2013.01); C04B 41/5031 (2013.01); C04B 41/5035 (2013.01); C04B 41/5059 (2013.01); C04B 41/507 (2013.01); C04B 41/89 (2013.01); C04B 2235/9684 (2013.01)

(58) Field of Classification Search
CPC .. C04B 41/5023; C04B 41/45; C04B 41/0072
See application file for complete search history.

(56) References Cited

U.S. PATENT DOCUMENTS

| 2,685,539 | A | 8/1954 | Woodburn, Jr. et al. |
|---|---|---|---|
| 2,685,540 | A | 8/1954 | Woodburn, Jr. et al. |
| 2,685,541 | A | 8/1954 | Woodburn, Jr. et al. |
| 2,685,542 | A | 8/1954 | Woodburn, Jr. et al. |
| 2,989,153 | A | 6/1961 | Boulet et al. |
| 3,342,627 | A | 9/1967 | Paxton et al. |
| 3,510,347 | A | 5/1970 | Strater |
| 3,692,150 | A | 9/1972 | Ruppe, Jr. |
| 3,713,882 | A | 1/1973 | DeBrunner et al. |
| 3,794,509 | A | 2/1974 | Trauger et al. |
| 3,972,395 | A | 8/1976 | Jannasch et al. |
| 4,290,510 | A | 9/1981 | Warren |
| 4,330,572 | A | 5/1982 | Frosch et al. |
| 4,332,856 | A | 6/1982 | Hsu |
| 4,425,407 | A | 1/1984 | Galasso et al. |
| 4,439,491 | A | 3/1984 | Wilson |
| 4,454,193 | A | 6/1984 | Block |
| 4,471,023 | A | 9/1984 | Shuford |
| 4,500,602 | A | 2/1985 | Patten et al. |
| 4,548,957 | A | 10/1985 | Hucke |
| 4,567,103 | A * | 1/1986 | Sara .................... C04B 41/5089 313/355 |
| 4,599,256 | A | 7/1986 | Vasilos |
| 4,617,232 | A | 10/1986 | Chandler et al. |
| 4,621,017 | A | 11/1986 | Chandler et al. |
| 4,663,060 | A | 5/1987 | Holinski |
| 4,702,960 | A | 10/1987 | Ogman |
| 4,711,666 | A | 12/1987 | Chapman et al. |
| 4,726,995 | A | 2/1988 | Chiu |
| 4,760,900 | A | 8/1988 | Shima et al. |
| 4,837,073 | A | 6/1989 | McAllister et al. |
| 4,863,001 | A | 9/1989 | Edmisten |
| 4,892,790 | A | 1/1990 | Gray |
| 4,958,998 | A | 9/1990 | Yamauchi et al. |
| 4,960,817 | A | 10/1990 | Spadafora |
| 5,073,454 | A | 12/1991 | Graham |
| 5,077,130 | A | 12/1991 | Okuyama et al. |

(Continued)

FOREIGN PATENT DOCUMENTS

| CN | 1046517 | 10/1990 | |
|---|---|---|---|
| CN | 101233341 A * | 7/2008 | ........... C04B 35/632 |

(Continued)

OTHER PUBLICATIONS

European Patent Office, European Office Action dated Oct. 22, 2021 in Application No. 19191306.0.
USPTO, Non-Final Office Action dated Nov. 18, 2021 in U.S. Appl. No. 15/076,348.
USPTO, Restriction/Election Requirement dated Dec. 1, 2021 in U.S. Appl. No. 16/190,817.
USPTO, First Action Interview Office Action dated May 9, 2022 in U.S. Appl. No. 16/029,134.
USPTO, Notice of Allowance dated May 25, 2022 in U.S. Appl. No. 17/330,163.

(Continued)

Primary Examiner — Tabatha L Penny

(74) Attorney, Agent, or Firm — SNELL & WILMER L.L.P.

(57) ABSTRACT

A method for forming an oxidation protection system on a composite structure are provided. The method includes applying a composite slurry to the composite structure, wherein the composite slurry comprises boron carbide, silicon carbide, borosilicate glass, an oxygen reactant compound including a silica forming component, and a carrier fluid and heating the composite structure to a temperature sufficient to form a boron-silicon-glass-oxygen reactant layer on the composite structure.

12 Claims, 9 Drawing Sheets

(56) References Cited

U.S. PATENT DOCUMENTS

| | | |
|---|---|---|
| 5,094,901 A | 3/1992 | Gray |
| 5,102,698 A | 4/1992 | Cavalier et al. |
| 5,153,070 A | 10/1992 | Andrus et al. |
| 5,179,048 A | 1/1993 | Niebylski et al. |
| 5,198,152 A | 3/1993 | Liimatta et al. |
| 5,215,563 A | 6/1993 | LaCourse et al. |
| 5,224,572 A | 7/1993 | Smolen et al. |
| 5,242,746 A | 9/1993 | Bommier et al. |
| 5,256,448 A | 10/1993 | De Castro |
| 5,273,819 A | 12/1993 | Jex |
| 5,298,311 A | 3/1994 | Bentson et al. |
| 5,324,541 A | 6/1994 | Shuford |
| 5,352,494 A | 10/1994 | Rousseau |
| 5,360,638 A | 11/1994 | Lequertier |
| 5,401,440 A | 3/1995 | Stover et al. |
| 5,427,823 A | 6/1995 | Varshney et al. |
| 5,439,080 A | 8/1995 | Haneda et al. |
| 5,480,676 A | 1/1996 | Sonuparlak et al. |
| 5,501,306 A | 3/1996 | Martino |
| 5,518,683 A | 5/1996 | Taylor et al. |
| 5,518,816 A | 5/1996 | Shuford |
| 5,536,574 A | 7/1996 | Carter |
| 5,622,751 A | 4/1997 | Thebault et al. |
| 5,629,101 A | 5/1997 | Watremez |
| 5,643,663 A | 7/1997 | Bommier et al. |
| 5,682,596 A | 10/1997 | Taylor et al. |
| 5,686,144 A | 11/1997 | Thebault et al. |
| 5,714,244 A | 2/1998 | Delaval et al. |
| 5,725,955 A | 3/1998 | Tawil et al. |
| 5,759,622 A | 6/1998 | Stover |
| 5,856,015 A | 1/1999 | Buchanan |
| 5,871,820 A | 2/1999 | Hasz et al. |
| 5,878,843 A | 3/1999 | Saum |
| 5,878,849 A | 3/1999 | Prunier, Jr. et al. |
| 5,901,818 A | 5/1999 | Martino |
| 5,958,846 A | 9/1999 | Geriner |
| 5,965,266 A | 10/1999 | Goujard et al. |
| 5,971,113 A | 10/1999 | Kesavan et al. |
| 5,981,072 A | 11/1999 | Mercuri et al. |
| 6,016,450 A | 1/2000 | Corck |
| 6,036,762 A | 3/2000 | Sambasivan |
| 6,071,603 A | 6/2000 | Sakai et al. |
| 6,071,615 A | 6/2000 | Solow et al. |
| 6,225,248 B1 | 5/2001 | Leiser et al. |
| 6,228,453 B1 | 5/2001 | Fareed et al. |
| 6,331,362 B1 | 12/2001 | Dupel et al. |
| 6,346,331 B2 | 2/2002 | Harvey et al. |
| 6,460,374 B2 | 10/2002 | Sakai et al. |
| 6,461,415 B1 | 10/2002 | Sambasivan et al. |
| 6,497,307 B1 | 12/2002 | Schoo et al. |
| 6,551,701 B1 | 4/2003 | Nohr et al. |
| 6,551,709 B1 | 4/2003 | Stover |
| 6,555,173 B1 | 4/2003 | Forsythe et al. |
| 6,632,762 B1 | 10/2003 | Zaykoski et al. |
| 6,668,984 B2 | 12/2003 | Gray |
| 6,676,887 B2 | 1/2004 | Lafdi |
| 6,737,120 B1 | 5/2004 | Golecki |
| 6,740,408 B2 | 5/2004 | Thebault |
| 6,759,117 B2 | 7/2004 | Bauer et al. |
| 6,884,467 B2 | 4/2005 | Walker et al. |
| 6,896,968 B2 | 5/2005 | Golecki |
| 6,913,821 B2 | 7/2005 | Golecki et al. |
| 6,969,422 B2 | 11/2005 | Mazany et al. |
| 7,011,888 B2 | 3/2006 | Bauer et al. |
| 7,118,805 B2 | 10/2006 | Walker et al. |
| 7,160,618 B2 | 1/2007 | Walker et al. |
| 7,311,944 B2 | 12/2007 | Sambasivan et al. |
| 7,501,181 B2 | 3/2009 | Walker et al. |
| 7,641,941 B2 | 1/2010 | Mazany et al. |
| 7,732,358 B2 | 6/2010 | Mazany et al. |
| 7,785,712 B2 | 8/2010 | Miller et al. |
| 7,938,877 B2 | 5/2011 | Liu et al. |
| 7,968,192 B2 | 6/2011 | Mazany et al. |
| 8,021,474 B2 | 9/2011 | Mazany et al. |
| 8,021,758 B2 | 9/2011 | Sambasivan et al. |
| 8,124,184 B2 | 2/2012 | Sambasivan et al. |
| 8,137,802 B1 | 3/2012 | Loehman et al. |
| 8,322,754 B2 | 12/2012 | Carcagno et al. |
| 8,962,083 B2 | 2/2015 | Murphy |
| 9,126,873 B2 | 9/2015 | Diss et al. |
| 9,388,087 B2 | 7/2016 | Don |
| 9,657,409 B2 | 5/2017 | Sandgren et al. |
| 9,758,678 B2 | 9/2017 | Nicolaus et al. |
| 9,790,133 B2 | 10/2017 | Mazany |
| 10,508,206 B2 | 12/2019 | Poteet |
| 10,526,253 B2 | 1/2020 | Poteet |
| 10,767,059 B2 | 9/2020 | Poteet |
| 10,941,486 B2 | 3/2021 | Mazany |
| 11,001,533 B2 | 5/2021 | Mazany et al. |
| 11,046,619 B2 | 6/2021 | Poteet |
| 11,072,565 B2 | 7/2021 | Weaver et al. |
| 11,091,402 B2 | 8/2021 | Poteet |
| 2002/0058576 A1 | 5/2002 | Mazany et al. |
| 2002/0096407 A1 | 7/2002 | Gray |
| 2002/0123592 A1 | 9/2002 | Zhang |
| 2003/0021975 A1 | 1/2003 | Martin |
| 2003/0143436 A1 | 7/2003 | Forsythe et al. |
| 2003/0194574 A1 | 10/2003 | Thebault et al. |
| 2004/0038032 A1 | 2/2004 | Walker et al. |
| 2004/0038043 A1 | 2/2004 | Golecki |
| 2004/0062009 A1 | 4/2004 | Osanai et al. |
| 2004/0213906 A1 | 10/2004 | Mazany et al. |
| 2005/0022698 A1 | 2/2005 | Mazany et al. |
| 2005/0127146 A1 | 6/2005 | Chaumat et al. |
| 2006/0159909 A1 | 7/2006 | Asian |
| 2007/0026153 A1 | 2/2007 | Nicolaus et al. |
| 2007/0154712 A1* | 7/2007 | Mazany ............... C04B 41/5092 428/408 |
| 2008/0058193 A1 | 3/2008 | Drake et al. |
| 2008/0142148 A1 | 6/2008 | Mazany |
| 2008/0311301 A1 | 12/2008 | Diss et al. |
| 2010/0044730 A1 | 2/2010 | Kwon et al. |
| 2010/0266770 A1 | 10/2010 | Mazany et al. |
| 2011/0311804 A1 | 12/2011 | Diss |
| 2013/0022826 A1 | 1/2013 | Kmetz |
| 2014/0196502 A1 | 7/2014 | Masuda |
| 2014/0227511 A1 | 8/2014 | Mazany |
| 2014/0349016 A1 | 11/2014 | Don |
| 2015/0183998 A1 | 7/2015 | Belov et al. |
| 2015/0291805 A1 | 10/2015 | Nicolaus et al. |
| 2015/0362029 A1 | 12/2015 | Edwards et al. |
| 2016/0122231 A1 | 5/2016 | Ishihara |
| 2016/0280585 A1 | 9/2016 | Mazany |
| 2016/0280612 A1 | 9/2016 | Mazany |
| 2017/0036945 A1 | 2/2017 | Ishihara |
| 2017/0267595 A1 | 9/2017 | Mazany |
| 2017/0342555 A1 | 11/2017 | Mazany |
| 2017/0349825 A1 | 12/2017 | Mazany |
| 2017/0369713 A1 | 12/2017 | Poteet |
| 2017/0369714 A1 | 12/2017 | Nicolaus et al. |
| 2018/0044537 A1 | 2/2018 | Poteet et al. |
| 2019/0055393 A1 | 2/2019 | Tsuji |
| 2019/0233324 A1 | 8/2019 | Poteet et al. |
| 2020/0148340 A1 | 5/2020 | Poteet et al. |
| 2021/0087102 A1 | 3/2021 | Simard et al. |
| 2021/0094887 A1 | 4/2021 | Poteet et al. |
| 2021/0198159 A1 | 7/2021 | Poteet et al. |

FOREIGN PATENT DOCUMENTS

| | | |
|---|---|---|
| CN | 101328077 | 12/2008 |
| CN | 101898906 | 12/2010 |
| CN | 102515850 | 6/2012 |
| CN | 101712563 | 9/2012 |
| CN | 103274760 | 9/2013 |
| CN | 105237039 | 11/2017 |
| CN | 105646007 | 4/2018 |
| CN | 107935634 | 4/2018 |
| CN | 107986807 | 10/2020 |
| CN | 113831155 | 12/2021 |
| DE | 69830510 | 3/2006 |
| EP | 200568 | 11/1986 |
| EP | 0677499 | 10/1995 |
| EP | 1043290 | 10/2000 |

(56) References Cited

FOREIGN PATENT DOCUMENTS

| | | |
|---|---|---|
| EP | 1693262 | 8/2006 |
| EP | 1834937 | 9/2007 |
| EP | 1968914 | 7/2010 |
| EP | 2684752 | 1/2014 |
| EP | 2767529 | 8/2014 |
| EP | 2774900 | 9/2014 |
| EP | 2930162 | 10/2015 |
| EP | 3072865 | 9/2016 |
| EP | 3072866 | 9/2016 |
| EP | 3222602 | 9/2017 |
| EP | 3255027 | 12/2017 |
| EP | 3282038 | 2/2018 |
| EP | 3184228 | 7/2019 |
| EP | 3530637 | 8/2019 |
| EP | 3590910 | 1/2020 |
| EP | 3702342 | 9/2020 |
| EP | 3842404 | 6/2021 |
| EP | 4086234 | 11/2022 |
| EP | 4227286 | 8/2023 |
| EP | 4279472 | 11/2023 |
| GB | 2468378 | 9/2010 |
| JP | S56105442 | 8/1981 |
| JP | S6011353 A | 1/1985 |
| JP | H0812477 | 1/1996 |
| JP | 09301786 | 11/1997 |
| JP | 2006036551 | 2/2006 |
| KR | 20050022947 | 3/2005 |
| KR | 20090035732 | 4/2009 |
| WO | WO 9742135 | 11/1997 |
| WO | WO 0051950 | 9/2000 |
| WO | 03084899 | 10/2003 |
| WO | WO 2007078419 | 7/2007 |
| WO | 2010001021 | 1/2010 |
| WO | WO 2014035413 | 3/2014 |
| WO | WO 2015169024 | 11/2015 |

OTHER PUBLICATIONS

USPTO, Corrected Notice of Allowance dated Mar. 1, 2023 in U.S. Appl. No. 16/190,817.
European Patent Office, European Office Action dated Feb. 17, 2023 in Application No. 17180 11.7.
USPTO, Non-Final Office Action dated Mar. 30, 2023 in U.S. Appl. No. 17/671,361.
European Patent Office, European Office Action dated Apr. 12, 2023 in Application No. 22207343.9.
European Patent Office, European Office Action dated May 23, 2023 in Application No. 23150808.6.
Chemical Abstracts, (Aug. 12, 1985), vol. 103, ISSN 0009-2258, XP000189303 [A] 1-15 abstract.
Buchanan F J, et al. "Particulate-containing glass sealants for carbon-carbon composites" Carbon, Elsevier Oxford, GB, vol. 33, No. 4, 1995, pp. 491-497.
USPTO, Notice of Allowance dated Dec. 21, 2022 in U.S. Appl. No. 16/190,817.
USPTO, Advisory Action dated Nov. 1, 2022 in U.S. Appl. No. 16/029,134.
European Patent Office, European Office Action dated Aug. 18, 2022 in Application No. 17183478.1.
European Patent Office, European Office Action dated Nov. 24, 2022 in Application No. 19184523.9
European Patent Office, European Office Action dated Jan. 26, 2023 in Application No. 19207148.8.
European Patent Office, European Search Report dated May 10, 2021 in Application No. 20216996.7.
International Searching Authority, International Search Report and Written Opinion dated Apr. 20, 2005 in Application No. PCT/US2004/012222.
International Searching Authority, International Preliminary Report on Patentability dated Aug. 18, 2005 in Application No. PCT/US2004/012222.
International Searching Authority, International Search Report and Written Opinion dated Jul. 3, 2007 in Application No. PCT/US2006/043343.
European Patent Office, Office Action dated Jan. 4, 2008 in Application No. 04816727.4.
USPTO, Office Action dated Feb. 26, 2008 in U.S. Appl. No. 10/829,144.
International Searching Authority, International Preliminary Report on Patentability dated Mar. 12, 2008 in Application No. PCT/US2006/043343.
USPTO, Final Office Action dated Jul. 16, 2008 in U.S. Appl. No. 10/829,144.
USPTO, Office Action dated Oct. 24, 2008 in U.S. Appl. No. 10/829,144.
European Patent Office, Communication Pursuant to Article 94(3) EPC dated Oct. 28, 2008 in European Application No. 06837063.4.
USPTO, Restriction Requirement dated Feb. 5, 2009 in U.S. Appl. No. 11/315,592.
USPTO, Final Office Action dated Jan. 29, 2009 in U.S. Appl. No. 10/829,144.
European Patent Office, Communication Pursuant to Article 94(3) EPC dated Feb. 9, 2009 in European Application No. 06837063.4.
USPTO, Office Action dated May 29, 2009 in U.S. Appl. No. 10/829,144.
USPTO, Office Action dated Jun. 9, 2009 in U.S. Appl. No. 11/315,592.
USPTO, Notice of Allowance dated Oct. 1, 2009 in U.S. Appl. No. 10/829,144.
USPTO, Final Office Action dated Dec. 11, 2009 in U.S. Appl. No. 11/315,592.
European Patent Office, Communication under Rule 71(3) EPC dated Feb. 4, 2010 in European Application No. 06837063.4.
USPTO, Advisory Action dated Feb. 25, 2010 in U.S. Appl. No. 11/315,592.
USPTO, Office Action dated Apr. 1, 2010 in U.S. Appl. No. 11/315,592.
European Patent Office, Partial European Search Report dated Oct. 29, 2010 in European Application No. 10169627.6.
USPTO, Office Action dated Feb. 4, 2011 in U.S. Appl. No. 12/619,061.
USPTO, Office Action dated Feb. 22, 2011 in U.S. Appl. No. 12/829,178.
European Patent Office, Extended European Search Report dated May 4, 2011 in European Application No. 10169627.6.
USPTO, Final Office Action dated Aug. 19, 2011 in U.S. Appl. No. 12/829,178.
USPTO, Advisory Action dated Oct. 27, 2011 in U.S. Appl. No. 12/829,178.
U.S. Appl. No. 15/076,348, filed Mar. 21, 2016 titled "High Temperature Oxidation Protection for Composites," 42 pages.
U.S. Appl. No. 15/169,219, filed May 31, 2016 titled "High Temperature Oxidation Protection for Composites," 37 pages.
U.S. Appl. No. 15/169,257, filed May 31, 2016 titled "High Temperature Oxidation Protection for Composites," 40 pages.
U.S. Appl. No. 15/174,537, filed Jun. 6, 2016 titled "Nanocomposite Coatings for Oxidation Protection for Composites," 44 pages.
U.S. Appl. No. 15/194,034, filed Jun. 27, 2016 titled "High Temperature Oxidation Protection for Composites," 49 pages.
U.S. Appl. No. 15/234,903, filed Aug. 11, 2016 titled "High Temperature Oxidation Protection for Composites," 41 pages.
U.S. Appl. No. 15/380,442, filed Dec. 15, 2016 titled "High Temperature Oxidation Protection for Composites," 41 pages.
European Patent Office, Extended European Search Report dated Jul. 26, 2016 in European Application No. 16161832.7.
USPTO, Restriction Requirement dated Nov. 7, 2016 in U.S. Appl. No. 14/671,637.
USPTO, Pre-Interview First Office Action dated Mar. 6, 2017 in U.S. Appl. No. 14/671,637.
USPTO, First Action Interview Office Action dated May 12, 2017 in U.S. Appl. No. 14/671,637.
USPTO, Restriction Requirement dated Jan. 5, 2018 in U.S. Appl. No. 15/076,348.

(56) References Cited

OTHER PUBLICATIONS

European Patent Office, Extended European Search Report dated Aug. 2, 2017 in European Application No. 17159538.2.
Rovner; "A Haven for Glass, Ceramics"; Science & Technology; May 24, 2004; pp. 33-39.
Air Products and Chemicals, Inc., "Complete Product Offering," 4 pages, retrieved from www.airproducts.com on Jun. 28, 2004.
McKee, Chemistry and Physics of Carbon, vol. 16, P.L. Walker and P.A. Thrower eds., Marcel Dekker, 1981, p. 30-42.
Sosman, "The Common Refractory Oxides," The Journal of Industrial and Engineering Chemistry, vol. 8, No. 11, Nov. 1916, pp. 985-990.
Almatis Website, C-333, Accessed Feb. 8, 2011, p. 1.
Montedo et al., Crystallisation Kinetics of a B-Spodumene-Based Glass Ceramic, Advances in Materials Science and Engineering, pp. 1-9, vol. 2012, Article ID 525428, Hindawi Publishing Corporation.
European Patent Office, Extended European Search Report dated Oct. 9, 2017 in European Application No. 17173709.1.
European Patent Office, Extended European Search Report dated Oct. 17, 2017 in European Application No. 17173707.5.
Sun Lee W et al., "Comparative study of thermally conductive fillers in underfill for the electronic components", Diamond and Related Materials, Elsevier Science Publishers, Amsterdam, NL, vol. 14, No. 10, Oct. 1, 2005 (Oct. 1, 2005), pp. 1647-1653.
Rockwood Lithium, Spodumene Concentrate SC 7.5 premium, Aug. 2015, pp. 1-2, the Lithium Company.
D.D.L. Chung: "Acid Aluminum Phosphate for the Binding and Coating of Materials", Journal of Materials Science, vol. 38, No. 13, 2003, pp. 2785-2791.
European Patent Office, Extended European Search Report dated Nov. 6, 2017 in European Application No. 17174481.6.
USPTO, Final Office Action dated Jan. 17, 2018 in U.S. Appl. No. 14/671,637.
European Patent Office, Communication Pursuant to Article 94(3) dated Jan. 3, 2018 in European Application No. 16161832.7.
European Patent Office, Extended European Search Report dated Nov. 20, 2017 in European Application No. 17175809.7.
European Patent Office, Extended European Search Report dated Nov. 20, 2017 in European Application No. 17178011.7.
European Patent Office, Partial European Search Report dated Jan. 13, 2018 in European Application No. 17183478.1.
USPTO, Advisory Action dated Mar. 30, 2018 in U.S. Appl. No. 14/671,637.
USPTO, Non-Final Office Action dated May 1, 2018 in U.S. Appl. No. 15/076,348.
USPTO, Restriction/Election Requirement dated May 24, 2018 in U.S. Appl. No. 15/174,537.
USPTO, Non-Final Office Action dated Mar. 28, 2018 in U.S. Appl. No. 15/234,903.
European Patent Office, European Search Report dated Apr. 11, 2018 in European Application No. 17183478.1-1103.
European Patent Office, European Search Report dated Apr. 13, 2018 in European Application No. 17207767.9-1106.
USPTO, Restriction/Election Requirement dated Jun. 19, 2018 in U.S. Appl. No. 15/194,034.
USPTO, Notice of Allowance dated Jun. 5, 2018 in U.S. Appl. No. 14/671,637.
USPTO, Corrected Notice of Allowance dated Jun. 22, 2018 in U.S. Appl. No. 14/671,637.
USPTO, Non-Final Office Action dated Jul. 27, 2018 in U.S. Appl. No. 15/174,537.
Steven A. Poteet, et al., U.S. Appl. No. 16/029,134, filed Jul. 6, 2018 titled "High Temperature Oxidation Protection for Composites ," 43 pages.
Steven A. Poteet, et al., U.S. Appl. No. 15/886,671, filed Feb. 1, 2018 titled "High Temperature Oxidation Protection for Composites ," 45 pages.
European Patent Office, European Office Action date Jul. 16, 2018 in Application No. 17174481.6.
Steven A. Poteet, U.S. Appl. No. 16/102,100, filed Aug. 13, 2018 titled "High Temperature Oxidation Protection for Composites ," 47 pages.
USPTO, Notice of Allowance dated Aug. 24, 2018 in U.S. Appl. No. 14/671,637.
Anthony Mazany, U.S. Appl. No. 16/116,665, filed Aug. 29, 2018 titled "Formulations for Oxidation Protection of Composite Articles", 30 pages.
USPTO, Restriction/Election Requirement dated Aug. 30, 2018 in U.S. Appl. No. 15/169,219.
USPTO, Restriction/Election Requirement dated Aug. 30, 2018 in U.S. Appl. No. 15/169,257.
USPTO, Final Office Action dated Oct. 26, 2018 in U.S. Appl. No. 15/234,903.
USPTO, Final Office Action dated Nov. 5, 2018 in U.S. Appl. No. 15/076,348.
Steven A. Poteet, U.S. Appl. No. 16/190,817, filed Nov. 14, 2018 titled "High Temperature Oxidation Protection for Composites", 38 pages.
USPTO, Non-Final Office Action filed Dec. 19, 2018 in U.S. Appl. No. 15/169,219.
USPTO, Non-Final Office Action filed Dec. 19, 2018 in U.S. Appl. No. 15/169,257.
USPTO, Non-Final Office Action filed Dec. 21, 2018 in U.S. Appl. No. 15/194,034.
USPTO, Advisory Action filed Dec. 28, 2018 in U.S. Appl. No. 15/076,348.
USPTO, Advisory Action filed Jan. 17, 2019 in U.S. Appl. No. 15/234,903.
USPTO, Final Office Action filed Feb. 14, 2019 in U.S. Appl. No. 15/174,537.
USPTO, Non-Final Office Action filed Feb. 25, 2019 in U.S. Appl. No. 15/234,903.
USPTO, Non-Final Office Action dated Apr. 16, 2019 in U.S. Appl. No. 15/076,348.
USPTO, Notice of Allowance dated Apr. 3, 2019 in U.S. Appl. No. 15/169,257.
USPTO, Advisory Action dated May 17, 2019 in U.S. Appl. No. 15/174,537.
USPTO, Final Office Action dated May 15, 2019 in U.S. Appl. No. 15/194,034.
USPTO, Restriction/Election Requirement dated Apr. 5, 2019 in U.S. Appl. No. 15/380,442.
USPTO, Non-Final Office Action filed Jun. 7, 2019 in U.S. Appl. No. 15/174,537.
USPTO, Notice of Allowance dated Jun. 17, 2019 in U.S. Appl. No. 15/169,257.
European Patent Office, European Office Action date Jun. 21, 2019 in Application No. 19155021.9.
USPTO, Notice of Allowance filed Jun. 26, 2019 in U.S. Appl. No. 15/169,219.
USPTO, Pre-Interview First Office Action dated Jul. 26, 2019 in U.S. Appl. No. 15/380,442.
USPTO, Notice of Allowance dated Aug. 13, 2019 in U.S. Appl. No. 15/194,034.
European Patent Office, Communication pursuant to Article 94(3) dated Aug. 28, 2019 in Application No. 17173707.5.
USPTO, Final Office Action filed Aug. 30, 2019 in U.S. Appl. No. 15/234,903.
The National Academics Press, Committee on Advanced Fibers for High-Temperature Ceramic Composites, Ceramic Fibers and Coatings: Advanced Materials for the Twenty-First Century, Chapter 6: Interfacial Coatings, (1998), p. 1-48 (Year: 1998).
USPTO, Notice of Allowance dated Sep. 25, 2019 in U.S. Appl. No. 15/380,442.
USPTO, Supplemental Notice of Allowance filed Oct. 2, 2019 in U.S. Appl. No. 15/169,219.
Steven A. Poteet, U.S. Appl. No. 16/666,809, filed Oct. 29, 2019 titled "High Temperature Oxidation Protection for Composites ," 45 pages.
USPTO, Advisory Action filed Nov. 20, 2019 in U.S. Appl. No. 15/234,903.

(56) References Cited

OTHER PUBLICATIONS

European Patent Office, European Search Report dated Nov. 25, 2019 in Application No. 19184523.9.
USPTO, Restriction/Election Requirement dated Dec. 13, 2019 in U.S. Appl. No. 15/886,671.
European Patent Office, European Search Report dated Dec. 13, 2019 in Application No. 19191306.0.
USPTO, Notice of Allowance dated Feb. 21, 2020 in U.S. Appl. No. 16/116,665.
European Patent Office, European Search Report dated Mar. 23, 2020 in Application No. 19207148.8.
USPTO, Pre-Interview First Office Action dated Apr. 17, 2020 in U.S. Appl. No. 15/886,671.
USPTO, Restriction/Election Requirement dated Apr. 30, 2020 in U.S. Appl. No. 16/029,134.
USPTO, Notice of Allowance filed May 1, 2020 in U.S. Appl. No. 15/234,903.
USPTO, Corrected Notice of Allowance dated May 28, 2020 in U.S. Appl. No. 16/116,665.
USPTO, First Action Interview Office Action dated Jun. 4, 2020 in U.S. Appl. No. 15/886,671.
USPTO, Corrected Notice of Allowance filed Jul. 9, 2020 in U.S. Appl. No. 15/234,903.
USPTO, Corrected Notice of Allowance filed Aug. 7, 2020 in U.S. Appl. No. 15/234,903.
USPTO, Restriction/Election Requirement filed Jul. 14, 2020 in U.S. Appl. No. 16/102,100.
USPTO, Final Office Action dated Sep. 9, 2020 in U.S. Appl. No. 15/886,671.
USPTO, Non-Final Office Action dated Oct. 29, 2020 in U.S. Appl. No. 16/666,809.
European Patent Office, European Office Action dated Oct. 22, 2020 in Application No. 17173709.1.
USPTO, Advisory Action dated Nov. 17, 2020 in U.S. Appl. No. 15/886,671.
USPTO, Non-Final Office Action filed Nov. 17, 2020 in U.S. Appl. No. 16/102,100.
USPTO, Notice of Allowance dated Dec. 7, 2020 in U.S. Appl. No. 16/589,368.
USPTO, Notice of Allowance dated Jan. 1, 2021 in U.S. Appl. No. 16/453,593.
USPTO, Supplemental Notice of Allowance dated Feb. 9, 2021 in U.S. Appl. No. 16/589,368.
USPTO, Supplemental Notice of Allowance dated Feb. 9, 2021 in U.S. Appl. No. 16/453,593.
USPTO, Final Office Action dated Feb. 2, 2021 in U.S. Appl. No. 16/666,809.
USPTO, Supplemental Notice of Allowance dated Mar. 2, 2021 in U.S. Appl. No. 16/453,593.
USPTO, Notice of Allowance dated Mar. 8, 2021 in U.S. Appl. No. 16/102,100.
USPTO, Decision on Appeal dated Apr. 5, 2021 in U.S. Appl. No. 15/076,348.
USPTO, Advisory Action dated Apr. 7, 2021 in U.S. Appl. No. 16/666,809.
USPTO, Notice of Allowance dated Apr. 15, 2021 in U.S. Appl. No. 16/668,852.
U.S. Appl. No. 17/308,776, filed May 5, 2021 titled "High Temperature Oxidation Protection for Carbon-Carbon Composites," 41 pages.
USPTO, Notice of Allowance dated Jun. 4, 2021 in U.S. Appl. No. 16/102,100.
European Patent Office, European Office Action dated Jul. 7, 2021 in Application No. 17183478.1.
USPTO, Notice of Allowance dated Jun. 11, 2021 in U.S. Appl. No. 16/668,852.
USPTO, Notice of Allowance dated Jul. 12, 2021 in U.S. Appl. No. 16/666,809.
U.S. Appl. No. 17/527,423, filed Nov. 16, 2021 entitled "High Temperature Oxidation Protection for Carbon-Carbon Composites," 41 pages.
USPTO, Supplemental Notice of Allowance dated Feb. 24, 2022 in U.S. Appl. No. 17/185,016.
USPTO, Pre-Interview First Office Action dated Mar. 21, 2022 in U.S. Appl. No. 16/029,134.
USPTO, Pre-Interview Office Action dated Mar. 1, 2022, 2022 in U.S. Appl. No. 16/190,817.
U.S. Appl. No. 17/671,361, filed Feb. 14, 2022 entitled "Oxidation Protection With Improved Water Resistance for Composites," 38 pages.
USPTO, Notice of Allowance dated Jul. 8, 2022 in U.S. Appl. No. 17/330,163.
USPTO, Notice of Allowance dated Jun. 29, 2022 in U.S. Appl. No. 17/378,207.
USPTO, Corrected Notice of Allowance dated Jul. 19, 2022 in U.S. Appl. No. 17/378,207.
USPTO, First Action Interview Office Action dated Jun. 30, 2022 in U.S. Appl. No. 16/190,817.
USPTO, Notice of Allowance dated Feb. 1, 2022 in U.S. Appl. No. 17/185,016.
U.S. Appl. No. 17/527,423, filed Nov. 16, 2021 titled "High Temperature Oxidation Protection for Carbon-Carbon Composites," 41 pages.
USPTO, Final Office Action dated Aug. 22, 2022 in U.S. Appl. No. 16/029,134.
USPTO, Notice of Allowance dated Aug. 31, 2022 in U.S. Appl. No. 17/330,163.
European Patent Office, European Search Report dated Sep. 23, 2022 in Application No. 22171665.7.
USPTO, Corrected Notice of Allowance dated Oct. 17, 2022 in U.S. Appl. No. 17/378,207.
European Patent Office, European Search Report dated Nov. 20, 2023 in Application No. 23179864.6.
"Yang et al: ""Effect of Al2O3 addition on the microstructure and oxidation behavior of SiC coating prepared by pack cementation on C/C composites"", Ceramics International, Elsevier, Amsterdam, NL, vol. 47, No. 20, Jul. 13, 2021 (Jul. 13, 2021), pp. 29309-29319, XP086762324, ISSN: 0272-8842, DOI: 10.1016/J.CERAMINT.2021.07.096 [retrieved on Jul. 13, 2021]".
USPTO, Restriction/Election Requirement dated Dec. 15, 2023 in U.S. Appl. No. 17/308,776.
European Patent Office, European Search Report dated Jul. 7, 2023 in Application No. 23156560.7.
European Patent Office, European Office Action dated Sep. 1, 2023 in Application No. 19184523.9.
European Patent Office, European Search Report dated Sep. 22, 2023 in Application No. 23173619.0.
Pechentkovskaya L. E. et al, "Effect of the different crystal structures of boron nitride on its high-temperature stability in oxygen", Soviet Powder Metallurgy and Metal Ceramics, [Online] vol. 20, No. 7, Jul. 1981 (Jul. 1981), pp. 510-512, DOI: 10.1007/BF00800535, Retrieved from the Internet: url: https://link.springer.com/article/10.1007/BF00800535, [retrieved on Sep. 13, 2023].
USPTO, Final Office Action dated Sep. 28, 2023 in U.S. Appl. No. 17/671,361.
USPTO, Examiner's Answer to Appeal Brief dated Sep. 7, 2023 in U.S. Appl. No. 16/029,134.
USPTO, Non-Final Office Action dated Feb. 1, 2024 in U.S. Appl. No. 17/671,361.
USPTO, Non-Final Office Action dated Jan. 16, 2024 in U.S. Appl. No. 17/527,423.
USPTO, Advisory Action dated Dec. 8, 2023 in U.S. Appl. No. 17/671,361.
USPTO; Non-Final Office Action dated Jun. 18, 2024 in U.S. Appl. No. 17/308,776.
European Patent Office, European Office Action dated Aug. 27, 2024 in Application No. 1919130601014.
European Patent Office, European Search Report dated Aug. 27, 2024 in Application No. 24163857.6.
USPTO; Notice of Allowance dated Apr. 19, 2024 in U.S. Appl. No. 17/527,423.

(56) References Cited

OTHER PUBLICATIONS

USPTO; Requirement for Restriction/ Election dated Jul. 17, 2024 in U.S. Appl. No. 17/747,816.
USPTO; Final Office Action dated Jun. 27, 2024 in U.S. Appl. No. 17/671,361.
European Patent Office, European Search Report dated Aug. 27, 2024 in Application No. 24164939.1.
European Patent Office, European Search Report dated Sep. 4, 2024 in Application No. 24164789.0.
USPTO; Advisory Action dated Sep. 5, 2024 in U.S. Appl. No. 17/671,361.
Tsung-Ming et al.: "On the Oxidation Kinetics and Mechanisms of Various SiC-Coated Carbon-Carbon Composites", Carbon, Elsevier Oxford, GB, vol. 29, No. 8, 1991, pp. 1257-1265, XP024029999, ISSN: 0008-6223, DOI: 10.1016/ 0008-6223(91)90045-K.

\* cited by examiner

HIGH TEMPERATURE OXIDATION PROTECTION FOR COMPOSITES

CROSS REFERENCE TO RELATED APPLICATIONS

This application claims priority to, and the benefit of, U.S. Provisional Application Ser. No. 62/954,113, titled "HIGH TEMPERATURE OXIDATION PROTECTION FOR COMPOSITES," filed Dec. 27, 2019, which is incorporated herein by reference in its entirety for all purposes.

FIELD

The present disclosure relates generally to composites and, more specifically, to oxidation protection systems for carbon-carbon composite structures.

BACKGROUND

Oxidation protection systems for carbon-carbon composites are typically designed to minimize loss of carbon material due to oxidation at operating conditions, which include temperatures of 900° C. (1652° F.) or higher. Oxidation protection systems may be configured to reduce infiltration of oxygen and oxidation catalysts into the composite structure. However, despite the use of such oxidation protection systems, significant oxidation of the carbon-carbon composites may still occur during operation of components such as, for example, aircraft braking systems. Oxidation protection systems having coatings of boron carbide and silicon carbide may exhibit hydrolytic instability, as boron oxide, which may be formed during operation of the component at increased temperatures, is water soluble.

SUMMARY

A method for forming an oxidation protection system on a composite structure is disclosed herein. In accordance with various embodiments, the method may comprise applying a composite slurry to the composite structure, the composite slurry may comprise a boron compound, a silicon compound, a glass compound, an oxygen reactant compound, and a carrier fluid. The method may further include heating the composite structure to a temperature sufficient to form a boron-silicon-glass-oxygen reactant layer on the composite structure.

In various embodiments, the boron compound may comprise boron carbide and the silicon compound may comprise silicon carbide. In various embodiments, the glass compound may comprise borosilicate glass and the oxygen reactant compound may comprise silicon dioxide.

In various embodiments, the method may further comprise applying a pretreatment composition to the composite structure. The pretreatment composition may comprise at least one of aluminum oxide or silicon dioxide.

In various embodiments, the boron compound may comprise at least one of titanium diboride, boron nitride, boron carbide, zirconium boride, silicon hexaboride, or elemental boron, and the silicon compound may comprise at least one of silicon carbide, silicon dioxide, a silicide compound, silicon, or silicon carbonitride, and the oxygen reactant compound may comprise at least one of a silica forming component, an alumina forming component, a phosphate, or a glass composition represented by the formula $A'O_x$ where A' is selected from lithium, sodium, magnesium, barium, strontium, calcium, potassium, titanium, zirconium, and yttrium.

In various embodiments, the oxygen reactant compound may be between 1.0% and 10.0% of a dry weight of the composite slurry.

An oxidation protection system disposed on an outer surface of a substrate is also disclosed herein. In accordance with various embodiments, the oxidation protection system may comprise a boron layer disposed over the outer surface and a silicon layer disposed on the boron layer. The boron layer may comprise a boron compound and a first glass compound. The silicon layer may comprise a silicon compound and a second glass compound.

In various embodiments, the boron compound may comprise at least one of titanium diboride, boron nitride, boron carbide, zirconium boride, silicon hexaboride, or elemental boron, and the silicon compound may comprise at least one of silicon carbide, silicon dioxide, a silicide compound, silicon, or silicon carbonitride.

In various embodiments, at least one of the boron layer or the silicon layer may include an oxygen reactant compound. In various embodiments, the oxygen reactant compound may comprise at least one of a silica forming component, an alumina forming component, a phosphate, or a glass composition represented by the formula $A'O_x$ where A' is selected from lithium, sodium, magnesium, barium, strontium, calcium, potassium, titanium, zirconium, and yttrium.

In various embodiments, the boron compound may comprise boron carbide, and the silicon compound may comprise silicon carbide, and the oxygen reactant compound may comprise silicon dioxide.

In various embodiments, a pretreatment layer may be formed between the boron layer and the outer surface of the substrate. The pretreatment layer may include at least one of aluminum oxide or silicon dioxide.

In various embodiments, a sealing layer may be formed over the silicon layer. The sealing layer may comprise at least one of phosphate glass, borosilicate glass, or mono-aluminum phosphate and phosphoric acid.

In accordance with various embodiments, a method for forming an oxidation protection system on a composite structure may comprise applying pretreatment composition to the composite structure, forming a boron layer over the pretreatment composition, and forming a silicon layer over the boron layer. The pretreatment composition may comprise at least one of aluminum oxide or silicon dioxide.

In various embodiments, forming the boron layer may comprise: applying a boron slurry to the composite structure, and performing a first low temperature bake by heating the composite structure at a first temperature. Forming the silicon layer may comprise applying a silicon slurry to the composite structure, performing a second low temperature bake by heating the composite structure at a second temperature, and performing a high temperature heat treatment by heating the composite structure at a third temperature. The third temperature may be greater than the first temperature and the second temperature.

In various embodiments, at least one of the boron slurry or the silicon slurry may further comprise an oxygen reactant compound. The oxygen reactant compound may comprise at least one of a silica forming component, an alumina forming component, a phosphate, or a glass composition represented by the formula $A'O_x$ where A' is selected from lithium, sodium, magnesium, barium, strontium, calcium, potassium, titanium, zirconium, and yttrium.

In various embodiments, the method may further comprise forming a sealing layer over the silicon layer. At least one of the boron layer or the silicon layer may be formed using chemical vapor deposition.

In various embodiments, forming the sealing layer may comprise applying a sealing slurry to the silicon layer, and heating the composite structure to a temperature sufficient to form the sealing layer. In various embodiments, the sealing slurry may comprise monoaluminum phosphate solution and phosphoric acid. In various embodiments, the sealing slurry may be a phosphate glass sealing slurry comprising a pre-slurry composition. The pre-slurry composition may comprise a phosphate glass composition

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

Figure 1A:
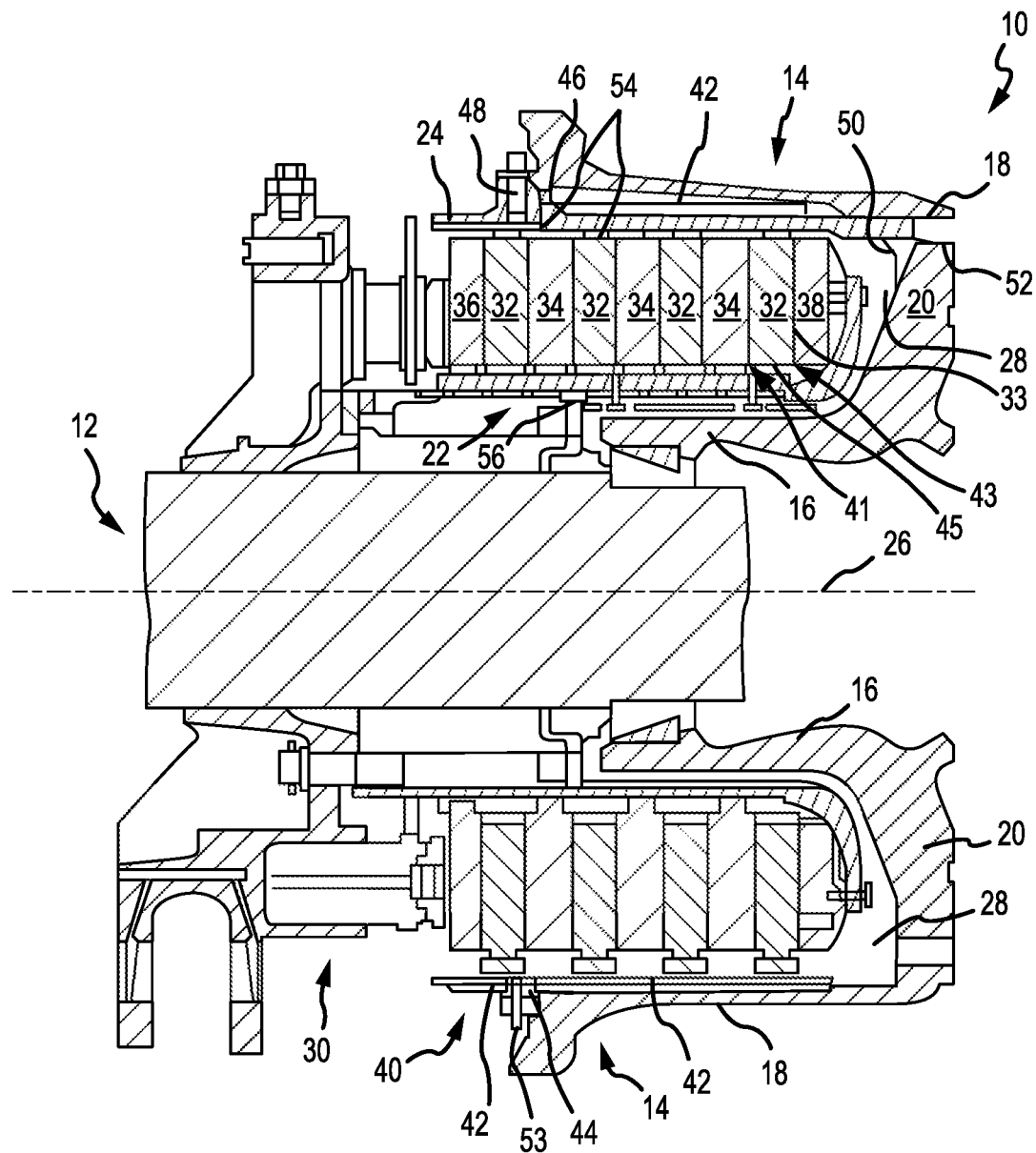
FIG. 1A illustrates a cross sectional view of an aircraft wheel braking assembly, in accordance with various embodiments.
Figure 1B:
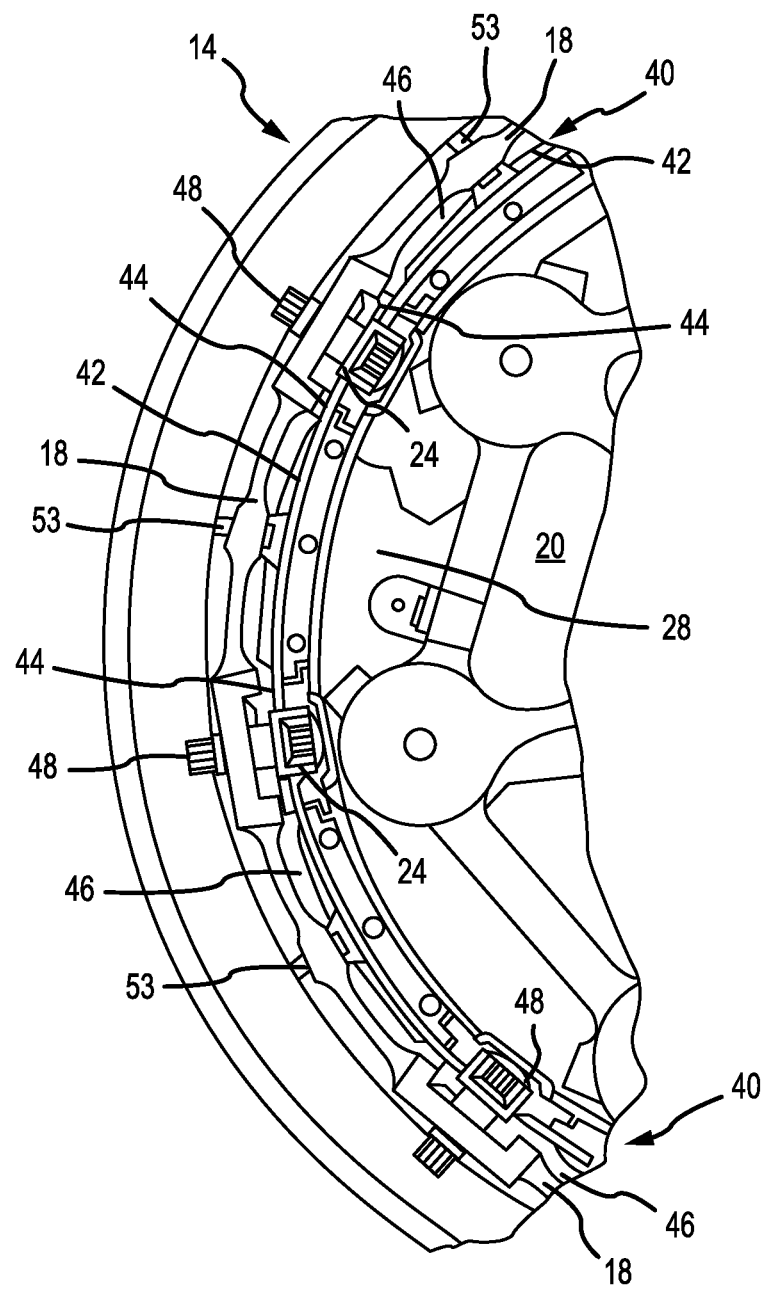
FIG. 1B illustrates a partial side view of an aircraft wheel braking assembly, in accordance with various embodiments.

With initial reference to FIGS. 1A and 1B, aircraft wheel braking assembly 10 such as may be found on an aircraft, in accordance with various embodiments is illustrated. Aircraft wheel braking assembly may, for example, comprise a bogie axle 12, a wheel 14 including a hub 16 and a wheel well 18, a web 20, a torque take-out assembly 22, one or more torque bars 24, a wheel rotational axis 26, a wheel well recess 28, an actuator 30, multiple brake rotors 32, multiple brake stators 34, a pressure plate 36, an end plate 38, a heat shield 40, multiple heat shield sections 42, multiple heat shield carriers 44, an air gap 46, multiple torque bar bolts 48, a torque bar pin 50, a wheel web hole 52, multiple heat shield fasteners 53, multiple rotor lugs 54, and multiple stator slots 56. FIG. 1B illustrates a portion of aircraft wheel braking assembly 10 as viewed into wheel well 18 and wheel well recess 28.

In various embodiments, the various components of aircraft wheel braking assembly 10 may be subjected to the application of compositions and methods for protecting the components from oxidation.

Brake disks (e.g., interleaved rotors 32 and stators 34) are disposed in wheel well recess 28 of wheel well 18. Rotors 32 are secured to torque bars 24 for rotation with wheel 14, while stators 34 are engaged with torque take-out assembly 22. At least one actuator 30 is operable to compress interleaved rotors 32 and stators 34 for stopping the aircraft. In this example, actuator 30 is shown as a hydraulically actuated piston, but many types of actuators are suitable, such as an electromechanical actuator. Pressure plate 36 and end plate 38 are disposed at opposite ends of the interleaved rotors 32 and stators 34. Rotors 32 and stators 34 can comprise any material suitable for friction disks, including ceramics or carbon materials, such as a carbon/carbon composite.

Through compression of interleaved rotors 32 and stators 34 between pressure plates 36 and end plate 38, the resulting frictional contact slows rotation of wheel 14. Torque take-out assembly 22 is secured to a stationary portion of the landing gear truck such as a bogie beam or other landing gear strut, such that torque take-out assembly 22 and stators 34 are prevented from rotating during braking of the aircraft.

Carbon-carbon composites (also referred to herein as composite structures, composite substrates, and carbon-carbon composite structures, interchangeably) in the friction disks may operate as a heat sink to absorb large amounts of kinetic energy converted to heat during slowing of the aircraft. Heat shield 40 may reflect thermal energy away from wheel well 18 and back toward rotors 32 and stators 34. With reference to FIG. 1A, a portion of wheel well 18 and torque bar 24 is removed to better illustrate heat shield 40 and heat shield sections 42. With reference to FIG. 1B, heat shield 40 is attached to wheel 14 and is concentric with wheel well 18. Individual heat shield sections 42 may be secured in place between wheel well 18 and rotors 32 by respective heat shield carriers 44 fixed to wheel well 18. Air gap 46 is defined annularly between heat shield sections 42 and wheel well 18.

Torque bars 24 and heat shield carriers 44 can be secured to wheel 14 using bolts or other fasteners. Torque bar bolts 48 can extend through a hole formed in a flange or other mounting surface on wheel 14. Each torque bar 24 can optionally include at least one torque bar pin 50 at an end opposite torque bar bolts 48, such that torque bar pin 50 can be received through wheel web hole 52 in web 20. Heat shield sections 42 and respective heat shield carriers 44 can then be fastened to wheel well 18 by heat shield fasteners 53.

Under the operating conditions (e.g., high temperature) of aircraft wheel braking assembly 10, carbon-carbon composites may be prone to material loss from oxidation of the carbon. For example, various carbon-carbon composite components of aircraft wheel braking assembly 10 may experience both catalytic oxidation and inherent thermal oxidation caused by heating the composite during operation. In various embodiments, composite rotors 32 and stators 34 may be heated to sufficiently high temperatures that may oxidize the carbon surfaces exposed to air. At elevated temperatures, infiltration of air and contaminants may cause internal oxidation and weakening, especially in and around brake rotor lugs 54 or stator slots 56 securing the friction disks to the respective torque bar 24 and torque take-out assembly 22. Because carbon-carbon composite components of aircraft wheel braking assembly 10 may retain heat for a substantial time period after slowing the aircraft, oxygen from the ambient atmosphere may react with the carbon matrix and/or carbon fibers to accelerate material loss. Further, damage to brake components may be caused by the oxidation enlargement of cracks around fibers or enlargement of cracks in a reaction-formed porous barrier coating (e.g., a silicon-based barrier coating) applied to the carbon-carbon composite.

Elements identified in severely oxidized regions of carbon-carbon composite brake components include potassium (K) and sodium (Na). These alkali contaminants may come into contact with aircraft brakes as part of cleaning or de-icing materials. Other sources include salt deposits left from seawater or sea spray. These and other contaminants (e.g. Ca, Fe, etc.) can penetrate and leave deposits in pores of carbon-carbon composite aircraft brakes, including the substrate and any reaction-formed porous barrier coating. When such contamination occurs, the rate of carbon loss by oxidation can be increased by one to two orders of magnitude.

In various embodiments, brake disks of aircraft wheel braking assembly 10 may reach operating temperatures in the range from about 100° C. (212° F.) up to about 900° C. (1652° F.), or higher (e.g., 1093° C. (2000° F.)). However, it will be recognized that the oxidation protection systems compositions and methods of the present disclosure may be readily adapted to many parts in this and other braking assemblies, as well as to other carbon-carbon composite structures susceptible to oxidation losses from infiltration of atmospheric oxygen and/or catalytic contaminants.

Figure 2A:
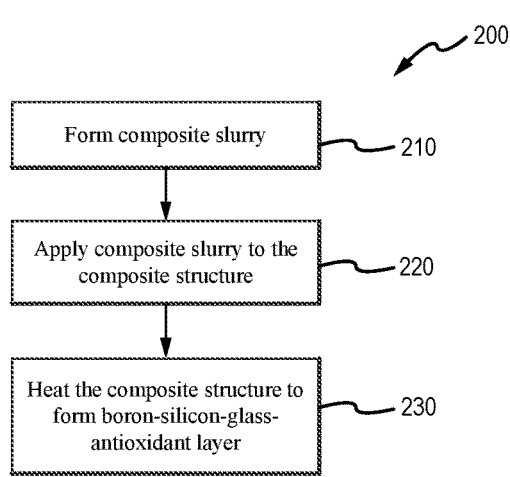
FIGS. 2A and 2B illustrate a method for forming an oxidation protection system on a composite structure, the oxidation protection system having a boron-silicon-glass-oxygen reactant layer, in accordance with various embodiments.

In various embodiments, a method for limiting an oxidation reaction in a substrate (e.g., a composite structure) may comprise forming an oxidation protection system on the composite structure. With reference to FIG. 2A, a method 200 for forming an oxidation protection system on a composite structure is illustrated. In accordance with various embodiments, method 200 may, for example, comprise applying an oxidation inhibiting composition to non-wearing surfaces of carbon-carbon composite brake components, such as non-wear surfaces 45 and/or lugs 54. Non-wear surface 45, as labeled in FIG. 1A, simply references an exemplary non-wear surface on a brake disk, but non-wear surfaces similar to non-wear surface 45 may be present on any brake disks (e.g., rotors 32, stators 34, pressure plate 36, end plate 38, or the like). In various embodiments, method 200 may be used on the back face of pressure plate 36 and/or end plate 38, an inner diameter (ID) surface of stators 34 including slots 56, as well as outer diameter (OD) surfaces of rotors 32 including lugs 54. The oxidation inhibiting composition of method 200 may be applied to preselected regions of a carbon-carbon composite structure that may be otherwise susceptible to oxidation. For example, aircraft brake disks may have the oxidation inhibiting composition applied on or proximate stator slots 56, rotor lugs 54, and/or non-wear surface 45. Method 200 may be performed on densified carbon-carbon composites. In this regard, method 200 may be performed after carbonization and densification of the carbon-carbon composite.

In various embodiments, method 200 may comprise forming a composite slurry (step 210) by combining a boron compound, a silicon compound, a glass compound, and an oxygen reactant compound with a carrier fluid (such as, for example, water). In various embodiments, the boron compound may comprise at least one boron-comprising refractory material (e.g., ceramic material). In various embodiments, the boron compound may comprise boron carbide, titanium diboride, boron nitride, zirconium boride, silicon hexaboride, and/or elemental boron.

In various embodiments, the silicon compound may comprise silicon carbide, a silicide compound, silicon, silicon dioxide ($SiO_2$), and/or silicon carbonitride. In various embodiments, the glass compound may be a borosilicate glass composition in the form of a glass frit. In various embodiments, the borosilicate glass composition may comprise silicon dioxide, boron trioxide ($B_2O_3$), and/or aluminum oxide ($Al_2O_3$). The borosilicate glass composition may comprise in weight percentage 13% $B_2O_3$, 61% $SiO_2$, 2% $Al_2O_3$, and 4% sodium oxide ($Na_2O$), and may have a coefficient of thermal expansion (CTE) of $3.3 \times 10^{-6}$ cm/C, a working point of 2286° F. (1252° C.), and an annealing point of 1040° F. (560° C.). In various embodiments, the glass compound may comprise a lithia potash borosilicate glass composition in the form of a glass frit, powder, or other suitable pulverized form and having a CTE of $3. \times 10^{-6}$ cm/C, a working point of 1954° F. (1068° C.), and an annealing temperature of 925° F. (496° C.). In various embodiments, the glass compound may comprise borophosphates, a borosilicate composition including in weight percentage, 96% $SiO_2$ and 4% $B_2O_3$ (which is available under the trade name VYCOR® from Corning Incorporated of Corning, New York, USA), quartz, aluminosilicate, boroaluminosilicate, and/or any other suitable glass compound, which may be in the form of a glass frit, powder, or other suitable pulverized form.

The oxygen reactant compound comprises a compound that reacts with oxygen. The oxygen reactant compound tends to reduce the amount of oxygen available for oxidizing the boron component of the boron compound. In this regard, the oxygen reactant compound competes with the boron component of the boron compound for available oxygen, thereby inhibiting oxidation of the boron component. The oxygen reactant compound also reacts with oxidized boron (i.e., boron oxide) to form a glassy boron component (e.g., borosilicates, aluminoborates, borophosphates, etc.). By consuming available oxygen and reacting with oxidized boron, the oxygen reactant compound tends to decrease the amount of boron oxide within the oxidation protection system. Decreasing the amount of boron oxide, which is highly water soluble, tends to increase the water stability of the oxidation protection system. Stated differently, decreasing the amount of boron oxide decreases the probability that the boron oxide will be lost to the environment if the substrate is exposed to water.

In various embodiments, the oxygen reactant compound may be selected from one or more silica forming components such as, for example, $SiO_2$, silicon, silicon carbide, silicon oxycarbide (SiOC), silicates (e.g., sodium silicate, magnesium silicate, etc.), organosilicates (e.g., tetraethylorthosilicate); one or more alumina forming components such as, for example, aluminum oxide, aluminum hydroxide, etc.; a phosphate; a glass composition represented by the formula $A'O_x$ where A' is selected from lithium (Li), Na, magnesium (Mg), barium (Ba), strontium (Sr), calcium (Ca), K, titanium (Ti), zirconium (Zr), and yttrium (Y); or combinations thereof.

In various embodiments, the oxygen reactant compound may form a 0.5% to 20.0% dry weight percentage of the composite slurry (i.e., the weight of the oxygen reactant compound is between 0.5% and 20% of the total weight of the combination of the boron compound, the silicon compound, the glass compound, and the oxygen reactant compound). In various embodiments, the oxygen reactant compound may form a 1.0% to 10.0% dry weight percentage of the composite slurry.

The weight percentage of the boron compound, the silicon compound, the glass compound, and the oxygen reactant compound within the composite slurry may be any suitable weight percentage. In various embodiments, the composite slurry comprises 60% to 70% by weight boron compound, silicon compound, glass compound, and oxygen reactant compound. Stated differently, in various embodiments, the composite slurry comprises 40% to 30% by weight carrier fluid. In various embodiments, the composite slurry comprises 62% to 67% by weight boron compound, silicon compound, glass compound, and oxygen reactant compound; or about a 66% by weight boron compound, silicon compound, glass compound, and oxygen reactant compound. As used in this context only, the term "about" means plus or minus one weight percent.

In various embodiments, the oxygen reactant compound may comprise a powder. The oxygen reactant compound may comprise particles having an average particle size between 20 nanometers (nm) and 20 micrometers (μm) (between $7.9 \times 10^{-7}$ inch and $7.9 \times 10^{-4}$ inch), between 30 nm and 10 μm (between $1.2 \times 10^{-6}$ inch and $3.9 \times 10^{-4}$ inch), between 30 nm and 2.0 μm (between $1.2 \times 10^{-6}$ inch and $7.9 \times 10^{-5}$ inch), or between 50 nm and 0.5 μm (between $2.0 \times 10^{-6}$ inch and $2.0 \times 10^{-5}$ inch inch).

In various embodiments, the composite slurry may comprise from 5% to 50% by weight boron compound, from 10% to 40% by weight boron compound, from 20% to 30% by weight boron compound, from 20% to 25% by weight boron compound, from 21% to 22% by weight boron compound, or about 21.1% by weight boron compound. As used in this context only, the term "about" means plus or minus 1 weight percent.

In various embodiments, the boron compound may comprise a boron compound powder (e.g., boron carbide powder). The boron compound comprises particles having an average particle size between 100 nm and 100 μm (between $3.9 \times 10^{-6}$ inch and 0.0039 inch), between 500 nm and 100 μm (between $2 \times 10^{-5}$ inch and 0.0039 inch), between 500 nm and 1 μm (between $2 \times 10^{-5}$ inch and $3.9 \times 10^{-5}$ inch), between 1 μm and 50 μm (between $3.9 \times 10^{-5}$ inch and 0.002 inch), between 1 μm and 20 μm (between $3.9 \times 10^{-5}$ inch and 0.0008 inch), between 1 μm and 10 μm (between $3.9 \times 10^{-5}$ inch and 0.0004 inch), about 0.7 μm ($2.8 \times 10^{-5}$ inch), about 9.3 μm (0.0004 inch), and/or about 50 μm (0.0020 inches). As used in this context only, the term "about" means plus or minus ten percent of the associated value.

In various embodiments, the boron compound may comprise particles of varying size. In various embodiments, the boron compound comprises a first group of particles having a first average particle size and a second group of particles having a second average particle size greater than the first average particle size.

In various embodiments, the particles of the first group may have an average particle size between 100 nm and 20 μm (between $3.9 \times 10^{-6}$ inch and 0.0008 inch), between 500 nm and 10 μm (between $2 \times 10^{-5}$ inch and 0.0004 inch), between 500 nm and 1.0 μm ($2 \times 10^{-5}$ inch and $3.9 \times 10^{-5}$ inch), or about 0.7 μm ($2.8 \times 10^{-5}$ inch). As used in this context only, the term "about" means plus or minus ten percent of the associated value.

In various embodiments, the particles of the second group may have an average particle size between 500 nm and 60 μm ($2 \times 10^{-5}$ inch and 0.0008 inch), 1 μm and 15 μm (between $2 \times 10^{-5}$ and 0.0006 inch), between 8 μm and 10.0 μm (between 0.0003 inch and 0.0008 inch), between 45 μm and 55 μm (between 0.0018 inch and 0.0022 inch), about 50 μm (0.0020 inch), and/or about 9.3 μm (0.00039 inch). As used in this context only, the term "about" means plus or minus ten percent of the associated value.

In various embodiments, the composite slurry may comprise from 10% to 40% by weight silicon compound, from 20% to 35% by weight silicon compound, from 25% to 30% by weight silicon compound, and/or about 27.2% by weight silicon compound. As used in this context only, the term "about" means plus or minus one weight percent.

In various embodiments, the silicon compound may comprise a silicon compound powder (e.g., silicon carbide powder). The silicon compound comprises particles having an average particle size between 100 nm and 50 μm (between $3.9 \times 10^{-6}$ inch and 0.0039 inch), between 500 nm and 20 μm (between $2 \times 10^{-5}$ inch and 0.0039 inch), between 500 nm and 1.5 μm (between $2 \times 10^{-5}$ inch and $3.9 \times 10^{-5}$ inch), between 15 μm and 20 μm (between $3.9 \times 10^{-5}$ inch and 0.002 inch), about 17 μm (0.0007 inch), and/or about 1.0 μm ($4 \times 10^{-5}$ inch). As used in this context only, the term "about" means plus or minus ten percent of the associated value.

In various embodiments, the silicon compound may comprise silicon compound particles of varying size. In various embodiments, the silicon compound comprises a first group of silicon compound particles having a first average particle size and a second group of silicon compound particles having a second average particle size. The first silicon compound average particle size may be less than the second silicon compound average particle size.

In various embodiments, the silicon compound particles of the first group have an average particle size between 100 nm and 20 μm (between $3.9 \times 10^{-6}$ inch and 0.0008 inch), 500 nm and 10 μm (between $2 \times 10^{-5}$ and 0.0004 inch); between 500 nm and 1.5 μm (between $2 \times 10^{-5}$ and $6 \times 10^{-5}$), or about 1.0 μm ($4 \times 10^{-5}$ inch). In various embodiments, the silicon compound particles of the second group may have an average particle size between 1 μm and 50 μm (between $4 \times 10^{-5}$ inch and 0.002 inch), between 5 μm and 25 μm (between 0.0002 inch and 0.001), between 16 μm and 18 μm (between 0.0006 inch and 0.0007 inch), or about 17 μm (0.00067 inches). As used in this context only, the term "about" means plus or minus ten percent of the associated value. In various embodiments, the silicon compound particles of the first average particle size form a larger weight percentage of the composite slurry as compared to the weight percentage formed by the silicon compound particles of the second average particle size.

In various embodiments, the composite slurry may comprise from 1% to 35% by weight glass compound, from 5% to 25% by weight glass compound, from 12% to 20% by weight glass compound, from 17% to 19% by weight glass compound, or about 18.1% by weight glass compound. As used in this context only, the term "about" means plus or minus one weight percent.

In various embodiments, the glass compound comprises particles having an average particle size between 500 nm and 50 μm (between $3.9 \times 10^{-6}$ inch and 0.0039 inch), between 5 μm and 25 μm (between $2 \times 10^{-5}$ inch and 0.0039 inch), between 10 μm and 15 μm (between $2 \times 10^{-5}$ inch and $3.9 \times 10^{-5}$ inch), between 11.5 μm and 13 μm (between $3.9 \times 10^{-5}$ inch and 0.002 inch), or about 12.3 μm (0.0004 inch). As used in this context only, the term "about" means the term "about" means plus or minus ten percent of the associated value.

The remaining weight percent of the composite slurry other than the boron compound, the silicon compound, the glass compound, and the oxygen reactant compound may comprise the carrier fluid and/or any other suitable additives. In various embodiments, the composite slurry consists of boron carbide, silicon carbide, borosilicate glass, silicon dioxide, and water. In various embodiments, the composite slurry may be substantially free of phosphate. In this case, "substantially free" means less than 0.01 percent by weight of the composite slurry.

In various embodiments, the composite slurry may comprise about 21.1% by weight boron carbide having an average particle size of about 9.3 μm (0.0004 inch), about 27.1% by weight silicon carbide having an average particle size of about 1 μm ($4 \times 10^{-5}$ inch), about 18.1% by weight borosilicate glass having an average particle size of about 12.3 μm (0.0005 inch), between about 0.5% and 0.6% by weight silicon dioxide, and about 33.2% by weight water; the borosilicate glass being comprised, in weight percentage of the borosilicate glass, of about 13% $B_2O_3$, about 61% $SiO_2$, about 2% $Al_2O_3$, and about 4% $Na_2O$. As used in this context only, the term "about" plus or minus ten percent of the associated value.

In various embodiments, method 200 further comprises applying the composite slurry to a composite structure (step 220). Applying the composite slurry may comprise, for example, spraying or brushing the composite slurry to an outer surface of the composite structure. Embodiments in which the carrier fluid for the composite slurry is water tends to cause the aqueous composite slurry to be more suitable for spraying or brushing application processes. Any suitable manner of applying the composite slurry to the composite structure is within the scope of the present disclosure. As referenced herein, the composite structure may refer to a carbon-carbon composite structure. In accordance with various embodiments, the composite slurry may be applied directly on (i.e., in physical contact with) the surface of the composite structure. In this regard, method 200 generally does not include a pretreatment composition and/or a pretreating step and/or forming a sealing layer prior to applying the composite slurry.

In various embodiments, method 200 may further comprise heating the composite structure to form a boron-silicon-glass-oxygen reactant layer on the composite structure (step 230). In various embodiments, the boron-silicon-glass-oxygen reactant layer may be formed directly adjacent to the composite structure. The heating of the composite structure may remove the carrier fluid from the composite slurry to form the boron-silicon-glass-oxygen reactant layer.

In various embodiments, step 230 may comprise heating the composite structure at a first, lower temperature followed by heating the composite structure at a second, higher temperature. For example, in various embodiments, the composite structure may undergo a first heat treatment at a first temperature of about 150° F. (65.5° C.) to about 250° F. (121.1° C.) followed by a second heat treatment at a second temperature of about 1600° F. (871° C.) to about 1700° F. (927° C.). In various embodiments, the first temperature may be about 200° F. (93.3° C.) and the second temperature may about 1650° F. (899° C.). As used in this context only, the term "about" means plus or minus 25° F. (4° C.). In various embodiment, the second temperature is selected to be below the working point of the glass compound, for example, below the working point of the borosilicate glass in the composite slurry.

Further, step 230 may be performed in an inert environment, such as under a blanket of inert or less reactive gas (e.g., nitrogen ($N_2$), argon, other noble gases, and the like). The composite structure may be heated prior to application of composite slurry to aid in the penetration of the composite slurry. The temperature rise may be controlled at a rate that removes water without boiling and provides temperature uniformity throughout the composite structure.

The composite structure may be heated at the first temperature for any suitable length of time for the desired application. In various embodiments, step 230 may, for example, comprise heating the composite structure at the first temperature for 5 minutes to 8 hours, 10 minutes to 2 hours, 10 minutes to 30 minutes, or about 10 minutes, wherein the term "about" in this context only means plus or minus ten percent of the associated value. The composite may be heated at the second temperature for any suitable length of time for the desired application. In various embodiments, step 230 may, for example, comprise heating the composite structure at the second temperature for 5 minutes to 8 hours, 0.5 hours to 4 hours, about 1.5 hours to about 2.5 hours, or about 2 hours, wherein the term "about" in this context only means plus or minus ten percent of the associated value. In various embodiments, step 230 may be the final step, as method 200 generally does not include a sealing layer step, as may be associated with other oxidation protection systems, for example, oxidation protection systems comprising phosphate sealing layers and/or aluminum phosphate sealing layers. In this regard, the boron-silicon-glass-oxygen reactant layer may form an exterior surface of the oxidation protection system. Stated differently, the boron-silicon-glass-oxygen reactant layer extends from the surface of the composite substrate to the exterior surface of the oxidation protection system.

With additional reference to FIG. 1, wear surfaces, such as wear surface 33, of brake disks may reach extremely high temperatures during operation (temperatures in excess of 1093° C. (2000° F.)). At such extreme temperatures of wear surfaces, the oxidation protection systems on non-wear surfaces adjacent to the wear surface (e.g., non-wear surface 45 adjacent to wear surface 33) may experience heating. As used herein, a "wear" surface refers to a surface of a friction disk that physically contacts an adjacent friction disk surface. As used herein, a "non-wear" surface refers to a surface of a friction disk that does not physically contact the surface of an adjacent friction disk.

Not to be bound by theory, it is believed that during operation, at elevated temperatures (e.g., around 1700° F. (927° C.) or 1800° F. (982° C.)), oxygen may diffuse through and/or travel through cracks in the boron-silicon-glass-oxygen reactant layer of the oxidation protection system and oxidize the boron compound in the boron-silicon-glass-oxygen reactant layer into boron trioxide ($B_2O_3$). At elevated temperatures (e.g., around 1700° F. (927° C.) or 1800° F. (982° C.)), the silicon compound in the boron-silicon-glass-oxygen reactant layer may also react (e.g., oxidize) to form silica. The silica may react with the boron trioxide to form borosilicate glass. The borosilicate glass may be formed in the cracks of the boron-silicon-glass-oxygen reactant layer. Therefore, the oxidation protection systems described herein have self-healing properties to protect against cracks formed in the layers of the oxidation protection systems, preventing, or mitigating against oxygen penetration and the resulting oxidation and loss of material. The oxygen reactant compound may also react (e.g., oxidize) to form, for example, additional silica, and/or alumina (i.e., aluminum oxide). The oxygen reactant compound reacts with the boron trioxide forming, for example, borosilicate glass, aluminoborate glass, borophosphate glass, etc. The oxygen reactant compound reacting with the boron trioxide, tends to decrease or eliminate unreacted boron trioxide from the boron-silicon-glass-oxygen reactant layer, thereby increasing the hydrolytic stability of the boron-silicon-glass-oxygen reactant layer.

Figure 2B:
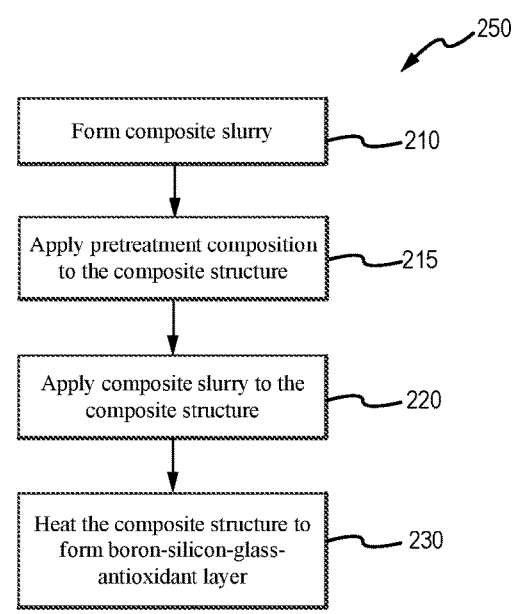

In various embodiments and with reference to FIG. 2B, a method 250 of forming an oxidation protection system on a composite structure is illustrated. In addition to steps 210, 220, and 230 from method 200 in FIG. 2A, method 250 may further comprise applying a pretreatment composition (step 215) prior to applying the composite slurry (step 220). Step 215 may, for example, comprise applying a pretreatment composition to an outer surface of a composite structure, such as a component of aircraft wheel braking assembly 10. In various embodiments, the pretreatment composition comprises an aluminum oxide, a silicon dioxide, or combinations thereof in water. For example, the aluminum oxide may comprise a nanoparticle dispersion of aluminum oxide (for example, NanoBYK-3600®, sold by BYK Additives & Instruments) and/or a nanoparticle dispersion of silicon dioxide. The pretreatment composition may further comprise a surfactant or a wetting agent. The composite structure may be porous, allowing the pretreatment composition to penetrate at least a portion of the pores of the composite structure. In various embodiments, after applying the pretreatment composition, the composite structure is heated to remove water and fix the aluminum oxide and/or silicon dioxide in place and thereby form a pretreatment layer comprised of aluminum oxide and/or silicon dioxide on the composite structure. The composite structure may be heated between about 100° C. (212° F.) and 200° C. (392° F.) or between 100° C. (212° F.) and 150° C. (302° F.). In accordance with various embodiments, method 250 may include applying the composite slurry (step 220) after the composite structure is heated to remove the water (or other carrier fluid) from the pretreatment composition. In this regard, the composite slurry may be applied on the pretreatment layer.

Not to be bound by theory, it is believed that the aluminum oxide and/or silicon dioxide from the pretreatment composition may react with the boron trioxide, which may form in the boron-silicon-glass-oxygen reactant layer at elevated temperatures. The aluminum oxide and/or silicon dioxide reacting with the boron trioxide, tends to decrease or eliminate unreacted boron trioxide from the boron-silicon-glass-oxygen reactant layer, thereby increasing the water stability of the boron-silicon-glass-oxygen reactant layer. In addition, migration of free boron oxide to the wear surface is limited due to reaction with the pretreatment composition. Boric acid is a lubricant; thus, it is desirable to eliminate any mobilization of such species to the wear surface.

Figure 3A:
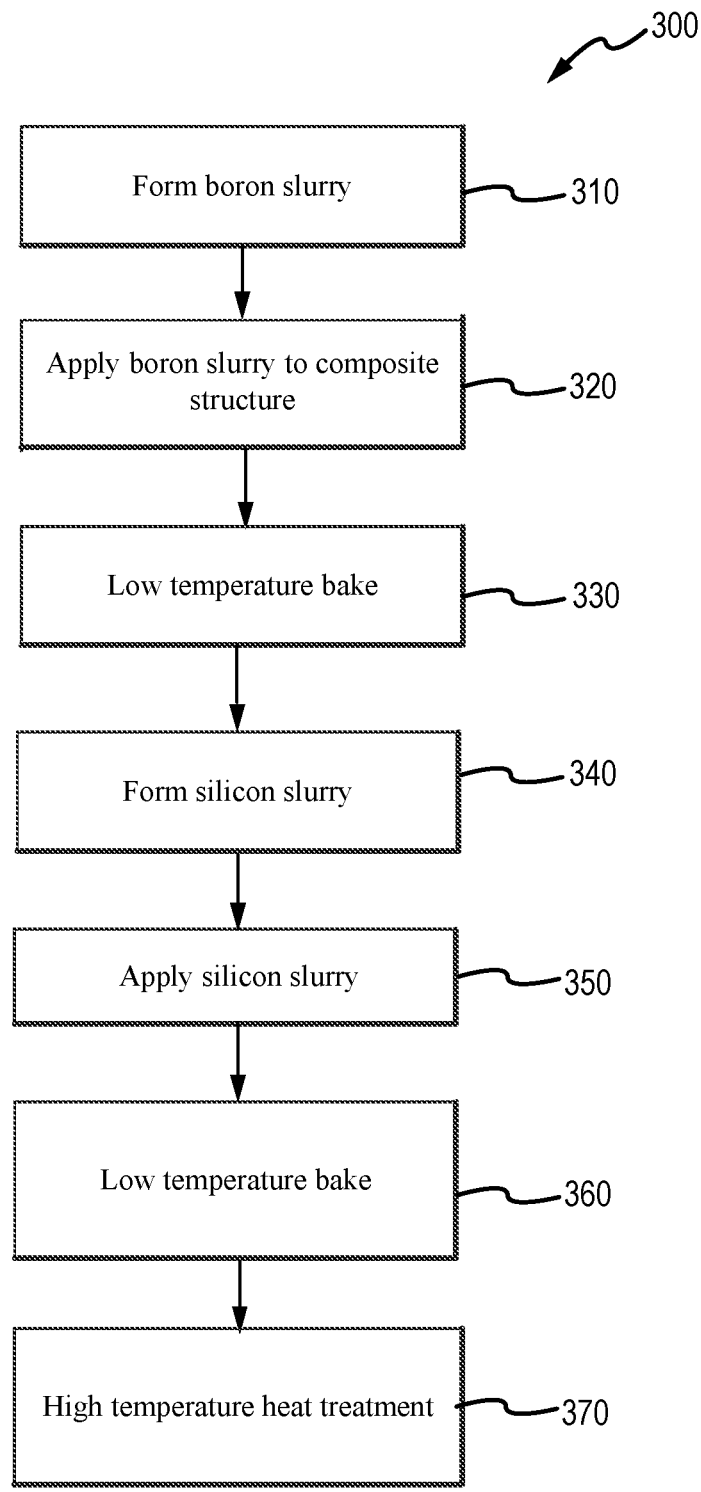
FIGS. 3A and 3B illustrate a method for forming an oxidation protection system on a composite structure, the oxidation protection system having a silicon-oxygen reactant layer formed over a boron-oxygen reactant layer in accordance with various embodiments.

With reference to FIG. 3A, a method 300 for forming an oxidation protection system on a composite structure is illustrated. In accordance with various embodiments, method 300 may, for example, comprise applying an oxidation inhibiting composition to non-wearing surfaces of carbon-carbon composite brake components, such as non-wear surfaces 45 and/or lugs 54. The oxidation inhibiting composition of method 300 may be applied to preselected regions of a carbon-carbon composite structure that may be otherwise susceptible to oxidation. For example, aircraft brake disks may have the oxidation inhibiting composition applied on non-wear surfaces 45. Method 300 may be performed on densified carbon-carbon composites. In this regard, method 300 may be performed after carbonization and densification of the carbon-carbon composite.

In various embodiments, method 300 may comprise forming a boron slurry (step 310) by combining a boron compound, a glass compound, and an oxygen reactant compound with a carrier fluid (such as, for example, water). In various embodiments, the boron compound may comprise at least one boron-comprising refractory material (e.g., ceramic materials). In various embodiments, the boron compound may comprise titanium diboride, boron nitride, boron carbide, zirconium boride, silicon hexaboride, and/or elemental boron. In various embodiments, the glass compound may comprise a borosilicate glass. The oxygen reactant compound may be selected from one or more silica forming components, one or more alumina forming components, a phosphate, a glass composition represented by the formula $A'O_x$ where $A'$ is selected from Li, Na, Mg, Ba, Sr, Ca, K, Ti, Zr, and Y, or combinations thereof.

In various embodiments, the oxygen reactant compound may form 0.5% to 20.0% of the dry weight percentage of the composite slurry (i.e., the weight of the oxygen reactant compound is between 0.5% and 20% of the total weight of the combination of the boron compound, the glass compound, and the oxygen reactant compound). In various embodiments, the oxygen reactant compound may form a 1.0% to 10.0% dry weight percentage of the boron slurry.

In various embodiments, the boron slurry may comprise from 5% to 50% by weight boron compound, from 15% to 40% by weight boron compound, from 30% to 40% by weight boron compound, or about 35% by weight boron compound. As used in this context only, the term "about" means plus or minus 1 weight percent.

In various embodiments, the boron compound may comprise a boron compound powder (e.g., boron carbide powder) comprising particles as described previously with regard to method 200. In this regard, the boron compound may comprise particles of varying size as previously with regard to method 200. In various embodiments, the boron compound comprises a first group of particles having a first average particle size, as previously with regard to method 200, and a second group of particles having a second average particle size, as previously with regard to method 200, that is greater than the first average particle size. In various embodiments, the boron compound particles of the second average particle size form a larger weight percentage of the boron slurry as compared to the weight percentage formed by the boron compound particles of the first size.

The glass compound of the boron slurry may comprise a borosilicate glass composition, borophosphate, quartz, aluminosilicate, boroaluminosilicate, and/or any other suitable glass compound, which may be in the form of a glass frit, powder, or other suitable pulverized form. In various embodiments, the borosilicate glass composition may comprise in weight percentage 13% $B_2O_3$, 61% $SiO_2$, 2% $Al_2O_3$, and 4% sodium oxide ($Na_2O$), and may have a CTE of $3.3 \times 10^{-6}$ cm/C, a working point of 2286° F. (1252° C.), and an annealing point of 1040° F. (560° C.). In various embodiments, the boron slurry may comprise from 1% to 35% by weight glass compound, from 5% to 15% by weight glass compound, or about 10% by weight glass compound. As used in this context only, the term "about" means plus or minus one weight percent.

In various embodiments, method 300 further comprises applying the boron slurry to a composite structure (step 320). Applying the boron slurry may comprise, for example, spraying or brushing the boron slurry to an outer surface of the composite structure. Any suitable manner of applying the boron slurry to the composite structure is within the scope of the present disclosure. As referenced herein, the composite structure may refer to a carbon-carbon composite structure. In accordance with various embodiments, the boron slurry may be applied directly on (i.e., in physical contact with) the surface of the composite structure. In this regard, method 300 generally does not include a pretreatment composition and/or a pretreating step and/or forming a sealing layer prior to applying the boron slurry or the silicon slurry.

In various embodiments, method 300 may further comprise performing a first low temperature bake (step 330). Step 330 may include heating the composite structure at a relatively low temperature (for example, a temperature of about 250° F. (121° C.) to about 350° F. (177° C.), or at about 300° F. (149° C.), wherein the term "about" in this context only means plus or minus 25° F. (4° C.)). Step 330 may include heating the composite structure for about 5 minutes to 8 hours, about 10 minutes to 2 hours, or about 1 hour, wherein the term "about" in this context only means plus or minus ten percent of the associated value.

In various embodiments, method 300 may comprise forming a silicon slurry (step 340) by combining a silicon compound, a glass compound, and an oxygen reactant compound with a carrier fluid (such as, for example, water). In various embodiments, the silicon compound may comprise silicon carbide, a silicide compound, silicon, silicon dioxide, and/or silicon carbonitride.

In various embodiments, the glass compound may comprise a borosilicate glass composition, borophosphate, quartz, aluminosilicate, boroaluminosilicate, and/or any other suitable glass compound, which may be in the form of a glass frit, powder, or other suitable pulverized form. In various embodiments, the borosilicate glass composition may comprise in weight percentage 13% $B_2O_3$, 61% $SiO_2$, 2% $Al_2O_3$, and 4% sodium oxide ($Na_2O$), and may have a CTE of $3.3 \times 10^{-6}$ cm/C, a working point of 2286° F. (1252° C.), and an annealing point of 1040° F. (560° C.).

The oxygen reactant compound may be selected from one or more silica forming components, one or more alumina forming components, a phosphate, a glass composition represented by the formula $A'O_x$ where A' is selected from Li, Na, Mg, Ba, Sr, Ca, K, Ti, Zr, and Y, or combinations thereof.

In various embodiments, the oxygen reactant compound may form a 0.5% to 20.0% dry weight percentage of the composite slurry (i.e., the weight of the oxygen reactant compound is between 0.5% and 20% of the total weight of the combination of the boron compound, the glass compound, and the oxygen reactant compound). In various embodiments, the oxygen reactant compound may form a 1.0% to 10.0% dry weight percentage of the boron slurry.

While method 300 describes forming both the boron slurry and the silicon slurry including an oxygen reactant compound, it is further contemplated and understood that oxygen reactant compound may be eliminated from either the boron slurry or the silicon slurry. In this regard, in various embodiments, method 300 may include forming either the boron slurry or the silicon slurry including an oxygen reactant compound.

In various embodiments, the silicon slurry may comprise from 10% to 70% by weight silicon compound, from 20% to 55% by weight silicon compound, from 40% to 50% by weight silicon compound, or about 45% by weight silicon compound. As used in this context only, the term "about" means plus or minus 2 weight percent.

In various embodiments, the silicon compound may comprise a silicon compound powder (e.g., silicon carbide powder) comprising particles, as described previously with regard to method 200. In various embodiments, the silicon compound may comprise silicon compound particles of varying size, as described previously with regard to method 200. In various embodiments, the silicon compound comprises a first group of silicon compound particles having a first average particle size, as described previously with regard to method 200, and a second group of silicon compound particles having a second average particle size, as described previously with regard to method 200. The first silicon compound average particle size may be less than the second silicon compound average particle size. In various embodiments, the silicon compound particles of the first average particle size form a larger weight percentage of the silicon slurry as compared to the weight percentage formed by the silicon compound particles of the second average particle size.

In various embodiments, the silicon slurry may comprise from 1% to 35% by weight glass compound, from 5% to 15% by weight glass compound, or about 10% by weight glass compound. As used in this context only, the term "about" means plus or minus one weight percent.

In various embodiments, method 300 further comprises applying the silicon slurry to the composite structure (step 350). The silicon slurry may be applied over the boron compound of the boron slurry and after the low temperature bake of step 330. In this regard, in various embodiments, the only heat treatment between application of the boron slurry (step 320) and the application of the silicon slurry (step 350) may be the first low temperature bake (step 330). Applying the silicon slurry may comprise, for example, spraying or brushing the boron slurry to an outer surface of the composite structure. Any suitable manner of applying the silicon slurry to the composite structure is within the scope of the present disclosure. As referenced herein, the composite structure may refer to a carbon-carbon composite structure.

In various embodiments, method 300 may further comprise performing a second low temperature bake (step 360). Step 360 may include heating the composite structure at a relatively low temperature (for example, a temperature of about 250° F. (121° C.) to about 350° F. (177° C.), or at about 300° F. (149° C.), wherein the term "about" in this context only means plus or minus 25° F. (4° C.)). Step 360 may include heating the composite structure for about 5 minutes to 8 hours, about 10 minutes to 2 hours, or about 1 hour, wherein the term "about" in this context only means plus or minus ten percent of the associated value.

In various embodiments, method 300 may further comprise performing a high temperature heat treatment to form a boron-oxygen reactant layer and a silicon-oxygen reactant layer on the composite structure (step 370). Step 370 may include heating the composite structure at a relatively high temperature, for example, a temperature of about 1500° F. (816° C.) to about 1700° F. (927° C.), or at about 1650° F. (899° C.), wherein the term "about" in this context only means plus or minus 25° F. (4° C.)). Step 370 may include heating the composite structure for about 5 minutes to 8 hours, about 30 minutes to 5 hours, or about 2 hours, wherein the term "about" in this context only means plus or minus ten percent of the associated value. Step 370 is performed after the second low temperature bake (step 360).

Not to be bound by theory, it is believed that boron components may become oxidized during service at high temperatures (e.g., temperatures greater than 1300° F. (704° C.)), thereby forming boron trioxide. The boron trioxide may come into contact with oxidized silicon components to form a borosilicate in situ, providing a method of self-healing. For a boron-silicon oxidation protection system, the probability of boron trioxide reacting with oxidized silicon compounds is kinetically controlled and influenced by the amount of each component, surface area, aspect ratio, etc. Boron trioxide is also volatile, especially when hydrated to form boric acid, and may be lost during extended service time. Method 300 tends to increase the probability of self-healing borosilicate formation by creating a layer of silicon compound by which boron trioxide must transport through prior to volatilization, reducing the dependence on aspect ratio and total amount of components in the slurry. The oxygen reactant compound in the boron-oxygen reactant layer and/or silicon-oxygen reactant layer may also react (e.g., oxidize) to form, for example, additional silica, and/or alumina (i.e., aluminum oxide). The oxygen reactant compound may also react with the boron trioxide forming, for example, borosilicate glass, aluminoborate glass, borophosphate glass, etc. in the boron-oxygen reactant and/or silicon-oxygen reactant layers. The oxygen reactant compound reacting with the boron trioxide, tends to decrease or eliminate unreacted boron trioxide, thereby increasing the water stability of the oxidation protection system.

Figure 3B:
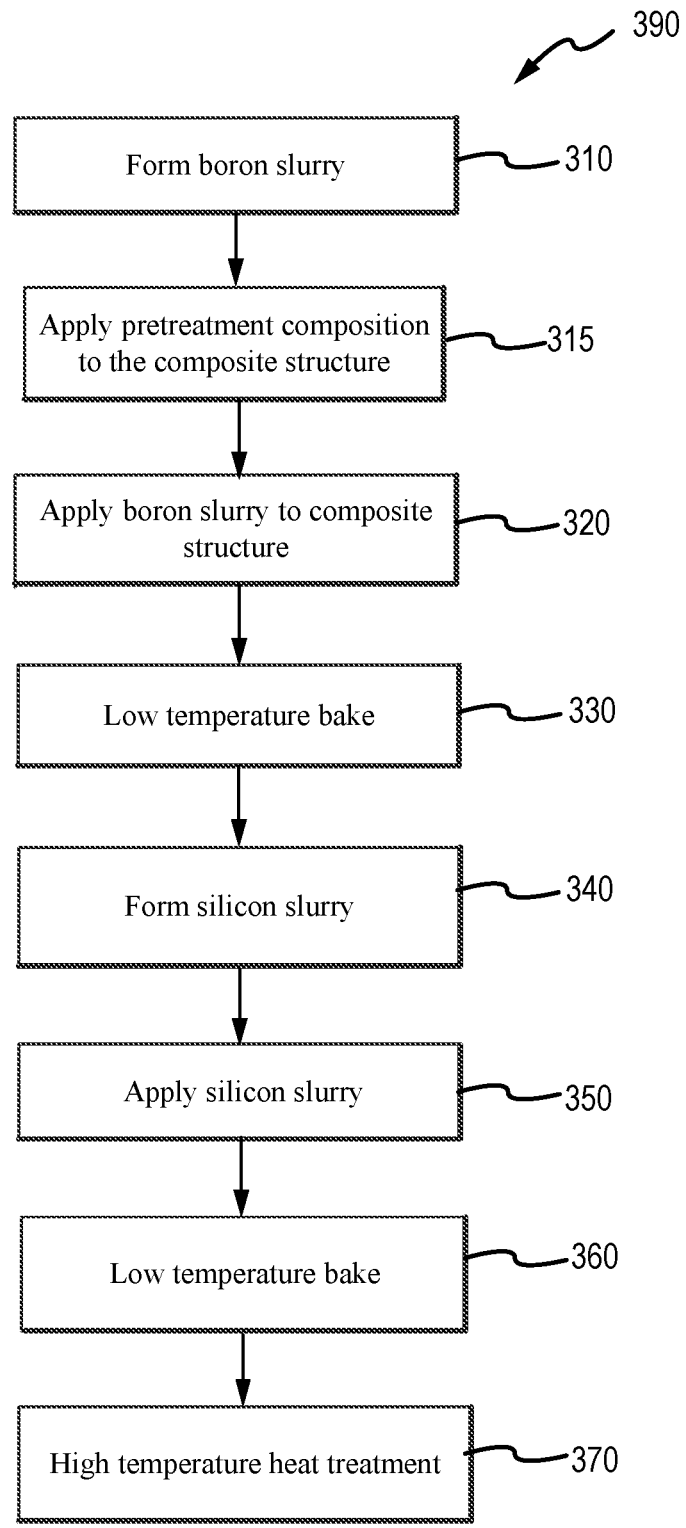

In various embodiments and with reference to FIG. 3B, a method 390 of forming an oxidation protection system on a composite structure is illustrated. In addition to steps 310, 320, 330, 340, 350, 360, and 370 from method 300 in FIG. 3A, method 390 may comprise applying a pretreatment composition to the composite structure (step 315) prior to applying the boron slurry (step 320). Step 315 may, for example, comprise applying a pretreatment composition to an outer surface of a composite structure, such as a component of aircraft wheel braking assembly 10. In various embodiments, the pretreatment composition comprises an aluminum oxide, a silicon dioxide, or combinations thereof in water. For example, the aluminum oxide may comprise a nanoparticle dispersion of aluminum oxide and/or a nanoparticle dispersion of silicon dioxide. The pretreatment composition may further comprise a surfactant or a wetting agent. In various embodiments, after applying the pretreatment composition, the composite structure is heated to remove water and fix the aluminum oxide and/or silicon dioxide in place. For example, the composite structure may be heated between about 100° C. (212° F.) and 200° C. (392° F.) or between 100° C. (212° F.) and 150° C. (302° F.). In accordance with various embodiments, method 390 may include applying the boron slurry (step 320) after applying the pretreatment composition.

Not to be bound by theory, it is believed that the aluminum oxide and/or silicon dioxide from the pretreatment composition may react with the boron trioxide, which may form in the boron-oxygen reactant layer at elevated temperatures. The aluminum oxide and/or silicon dioxide reacting with the boron trioxide, tends to decrease or eliminate unreacted boron trioxide, thereby increasing the water stability of the oxidation protection system.

Figure 4:
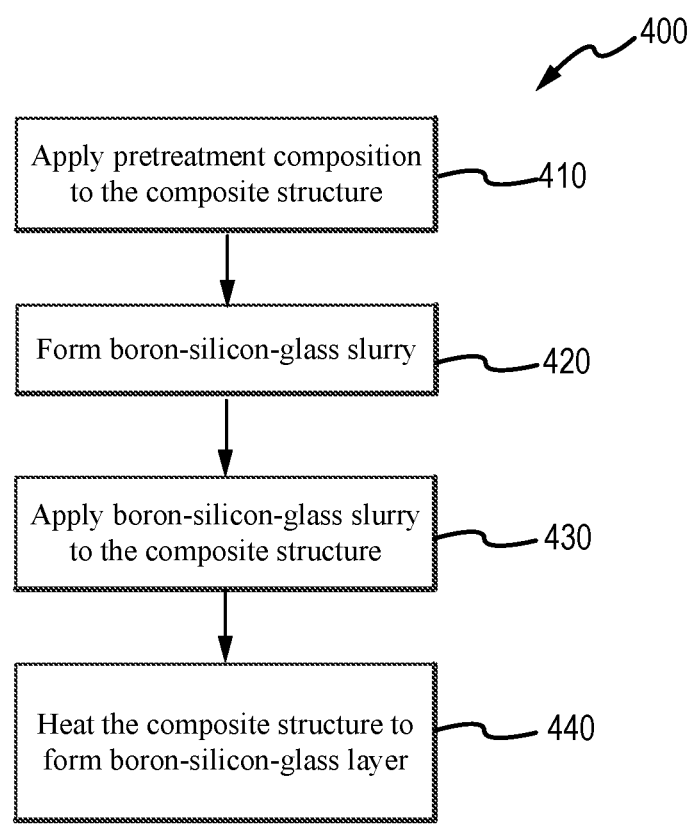
FIG. 4 illustrates a method for forming an oxidation protection system on a composite structure, in accordance with various embodiments.

With reference to FIG. 4, a method of 400 of forming an oxidation protection system on composite structure is illustrated. In accordance with various embodiments, method 400 may, for example, comprise applying an oxidation inhibiting composition to non-wearing surfaces of carbon-carbon composite brake components, such as non-wear surfaces 45 and/or lugs 54 in FIG. 1A. Method 400 may be performed on densified carbon-carbon composites. In this regard, method 400 may be performed after carbonization and densification of the carbon-carbon composite.

In various embodiments, method 400 may comprise applying a pretreatment composition to an outer surface of a composite structure (step 410). The composite structure may be a component of aircraft wheel braking assembly 10 in FIG. 1A. In various embodiments, the pretreatment composition comprises an aluminum oxide, a silicon dioxide, or combinations thereof in water. For example, the aluminum oxide may comprise a nanoparticle dispersion of aluminum oxide and/or a nanoparticle dispersion of silicon dioxide. The pretreatment composition may further comprise a surfactant or a wetting agent. In various embodiments, after applying the pretreatment composition, the composite structure is heated to remove water and fix the aluminum oxide and/or silicon dioxide in place. For example, the composite structure may be heated between about 100° C. (212° F.) and 200° C. (392° F.), between 100° C. (212° F.) and 150° C. (302° F.).

Method 400 may further includes forming a boron-silicon-glass slurry (step 420) by combining a boron compound, a silicon compound, and a glass compound with a carrier fluid (such as, for example, water). In various embodiments, the boron compound may comprise at least one boron-comprising refractory material (e.g., ceramic material). In various embodiments, the boron compound may comprise boron carbide, titanium diboride, boron nitride, zirconium boride, silicon hexaboride, and/or elemental boron.

In various embodiments, the silicon compound may comprise silicon carbide, a silicide compound, silicon, silicon dioxide, or silicon carbonitride. In various embodiments, the glass compound may be a borosilicate glass composition, borophosphate, quartz, aluminosilicate, boroaluminosilicate, and/or any other suitable glass compound, which may be in the form of a glass frit, powder, or other suitable pulverized form. In various embodiments, the borosilicate glass composition may comprise in weight percentage 13% $B_2O_3$, 61% $SiO_2$, 2% $Al_2O_3$, and 4% sodium oxide ($Na_2O$), and may have a CTE of $3.3 \times 10^{-6}$ cm/C, a working point of 2286° F. (1252° C.), and an annealing point of 1040° F. (560° C.).

In various embodiments, the composite slurry may comprise from 5% to 50% by weight boron compound, from 10% to 40% by weight boron compound, from 20% to 30% by weight boron compound, from 20% to 25% by weight boron compound, from 21% to 22% by weight boron compound, or about 21.2% by weight boron compound. As used in this context only, the term "about" means plus or minus 1 weight percent.

In various embodiments, the boron compound may comprise a boron compound powder (e.g., boron carbide powder) with particles having an average particle size as previously described with respect to method 200. In various embodiments, the boron compound may comprise particles of varying size as previously described with respect to method 200. In various embodiments, the boron compound comprises a first group of particles having a first average particle size and a second group of particles having a second average particle size greater than the first average particle size.

In various embodiments, the particles of the first group may have an average particle size between 100 nm and 20 μm (between $3.9 \times 10^{-6}$ inch and 0.0008 inch), between 500 nm and 10 μm (between $2 \times 10^{-5}$ inch and 0.0004 inch), between 500 nm and 1.0 μm ($2 \times 10^{-5}$ inch and $3.9 \times 10^{-5}$ inch), or about 0.7 μm ($2.8 \times 10^{-5}$ inch). As used in this context only, the term "about" means plus or minus ten percent of the associated value.

In various embodiments, the particles of the second group may have an average particle size between 500 nm and 60 μm ($2 \times 10^{-5}$ inch and 0.0008 inch), 1 μm and 15 μm (between $2 \times 10^{-5}$ and 0.0006 inch), between 8 μm and 10.0 μm (between 0.0003 inch and 0.0008 inch), between 45 μm and 55 μm (between 0.0018 inch and 0.0022 inch), about 50 μm (0.0020 inch), and/or about 9.3 μm (0.00039 inch). As used in this context only, the term "about" means plus or minus ten percent of the associated value.

In various embodiments, the boron compound particles of the second average particle size form a larger weight percentage of the boron-silicon-glass slurry as compared to the weight percentage formed by the boron compound particles of the first average size. In various embodiments, the boron-silicon-glass slurry may comprise from 0% to 20% by weight the boron compound first average particle size, 5% to 8% by weight the boron compound first average particle size, about 6.36% by weight the first boron compound average particle size, or about 7.24% by weight the first boron compound average particle size. As used in this context only, the term "about" means plus or minus 0.5% weight percent. In various embodiments, the boron-silicon-glass slurry may comprise from 5% to 30% by weight the second boron compound average particle size, 10% to 25% by weight the second boron compound average particle size, 14% to 23% by weight the second boron compound average particle size, about 14.9% by weight the second boron compound average particle size about 16.9% by weight the second boron compound average particle size, or about 21.2% by weight the second boron compound average particle size. As used in this context only, the term "about" means plus or minus 0.5% weight percent.

In various embodiments, the boron-silicon-glass slurry may comprise from 10% to 40% by weight silicon compound, from 25% to 35% by weight silicon compound, from 27% to 32% by weight silicon compound, about 27.3% by weight silicon compound, or about 31.0% by weight silicon compound. As used in this context only, the term "about" means plus or minus one weight percent.

In various embodiments, the silicon compound may comprise a silicon compound powder (e.g., silicon carbide powder) with particles having an average particle size as described previously with regard to method 200.

In various embodiments, the silicon compound may comprise silicon compound particles of varying size. In various embodiments, the silicon compound comprises a first group of silicon compound particles having a first average particle size and a second group of silicon compound particles having a second average particle size. The first silicon compound average particle size may be less than the second silicon compound average particle size.

In various embodiments, the silicon compound particles of the first group have an average particle size between 100 nm and 20 μm (between $3.9 \times 10^{-6}$ inch and 0.0008 inch), 500 nm and 10 μm (between $2 \times 10^{-5}$ and 0.0004 inch); between 500 nm and 1.5 μm (between $2 \times 10^{-5}$ and $6 \times 10^{-5}$), or about 1.0 μm ($4 \times 10^{-5}$ inch). In various embodiments, the silicon compound particles of the second group may have an average particle size between 1 μm and 50 μm (between $4 \times 10^{-5}$ inch and 0.002 inch), between 5 μm and 25 μm (between 0.0002 inch and 0.001), between 16 μm and 18 μm (between 0.0006 inch and 0.0007 inch), or about 17 μm (0.00067 inches). As used in this context only, the term "about" means plus or minus ten percent of the associated value.

In various embodiments, the silicon compound particles of the first average particle size form a larger weight percentage of the boron-silicon-glass composite slurry as compared to the weight percentage formed by the silicon compound particles of the second average particle size. In various embodiments, the boron-silicon-glass slurry may comprise from 0% to 30% by weight the second silicon compound average particle size, 0% to 25% by weight the second silicon compound average particle size, or about 9.3% by weight the second silicon compound average particle size. As used in this context only, the term "about" means plus or minus 1% weight percent. In various embodiments, the boron-silicon-glass slurry may comprise from 5% to 40% by weight the first silicon compound average particle size, 10% to 35% by weight the first silicon compound average particle size, 20% to 30% by weight the first silicon compound average particle size, about 21.7% by weight the second silicon compound average particle size, about 27.3% by weight the second silicon compound average particle size, or about 29.0% by weight the second silicon compound average particle size. As used in this context only, the term "about" means plus or minus 1% weight percent.

In various embodiments, the boron-silicon-glass slurry may comprise from 1% to 35% by weight glass compound, from 5% to 30% by weight glass compound, from 12% to 20% by weight glass compound, from 17% to 19% by weight glass compound, or about 18.2% by weight glass compound. As used in this context only, the term "about" means plus or minus one weight percent.

In various embodiments, the glass compound comprises particles, the average particle size may be between 500 nm and 50 μm (between $3.9 \times 10^{-6}$ inch and 0.0039 inch), between 5 μm and 25 μm (between $2 \times 10^{-5}$ inch and 0.0039 inch), between 10 μm and 15 μm (between $2 \times 10^{-5}$ inch and $3.9 \times 10^{-5}$ inch), between 11.5 μm and 13 μm (between $3.9 \times 10^{-5}$ inch and 0.002 inch), or about 12.3 μm (0.0004 inch). As used in this context only, the term "about" means the term "about" means plus or minus ten percent of the associated value.

The remaining weight percent of the boron-silicon-glass composite slurry other than the boron compound, the silicon compound, and the glass compound may comprise the carrier fluid and/or any other suitable additives. In various embodiments, the boron-silicon-glass slurry consists of boron carbide, silicon carbide, borosilicate glass, and water. In various embodiments, the boron-silicon-glass slurry may be substantially free of phosphate. In this case, "substantially free" means less than 0.01 percent by weight of the composite slurry.

In various embodiments, the boron-silicon-glass slurry may comprise about 21.2% by weight boron carbide having an average particle size of about 9.3 μm (0.0004 inch), about 27.3% by weight silicon carbide having an average particle size of about 1 μm ($4 \times 10^{-5}$ inch), about 18.2% by weight borosilicate glass having an average particle size of about 12.3 μm (0.0005 inch), and about 33.3% by weight water; the borosilicate glass being comprised, in weight percentage of the borosilicate glass, of about 13% $B_2O_3$, about 61%

$SiO_2$, about 2% $Al_2O_3$, and about 4% $Na_2O$. As used in this context only, the term "about" plus or minus ten percent of the associated value.

In various embodiments, method 400 further comprises applying the boron-silicon-glass slurry to a composite structure (step 430). Applying the boron-silicon-glass slurry may comprise, for example, spraying or brushing the composite slurry to an outer surface of the composite structure. Embodiments in which the carrier fluid for the composite slurry is water tends to cause the aqueous composite slurry to be more suitable for spraying or brushing application processes. Any suitable manner of applying the composite slurry to the composite structure is within the scope of the present disclosure. As referenced herein, the composite structure may refer to a carbon-carbon composite structure. In accordance with various embodiments, the boron-silicon-glass slurry may be applied over the aluminum oxide and/or silicon dioxide of the pretreatment composition.

In various embodiments, method 400 may further comprise heating the composite structure to form a boron-silicon-glass layer on the composite structure (step 440). Step 440 may remove the carrier fluid from the boron-silicon-glass slurry to form the boron-silicon-glass layer.

In various embodiments, step 440 may comprise heating the composite structure at a first, lower temperature followed by heating the composite structure at a second, higher temperature. For example, in various embodiments, the composite structure may undergo a first heat treatment at a first temperature of about 150° F. (65.5° C.) to about 250° F. (121.1° C.) followed by a second heat treatment at a second temperature of about 1600° F. (871° C.) to about 1700° F. (927° C.). In various embodiments, the first temperature may be about 200° F. (93.3° C.) and the second temperature may about 1650° F. (899° C.). As used in this context only, the term "about" means plus or minus 25° F. (4° C.). In various embodiment, the second temperature is selected to be below the working point of the glass compound, for example, below the working point of the borosilicate glass in the composite slurry.

Further, step 440 may be performed in an inert environment, such as under a blanket of inert or less reactive gas (e.g., nitrogen ($N_2$), argon, other noble gases, and the like). The composite structure may be heated prior to application of composite slurry to aid in the penetration of the composite slurry. The temperature rise may be controlled at a rate that removes water without boiling and provides temperature uniformity throughout the composite structure.

The composite may be heated at the first temperature for any suitable length of time for the desired application. In various embodiments, step 440 may, for example, comprise heating the composite structure at the first temperature for 5 minutes to 8 hours, 10 minutes to 2 hours, 10 minutes to 30 minutes, or about 10 minutes, wherein the term "about" in this context only means plus or minus ten percent of the associated value. The composite may be heated at the second temperature for any suitable length of time for the desired application. In various embodiments, step 440 may, for example, comprise heating the composite structure at the second temperature for 5 minutes to 8 hours, 0.5 hours to 4 hours, about 1.5 hours to about 2.5 hours, or about 2 hours, wherein the term "about" in this context only means plus or minus ten percent of the associated value. In various embodiments, step 440 may be the final step, as method 400 generally does not include a sealing layer step, as may be associated with other oxidation protection systems, for example, oxidation protection systems comprising phosphate sealing layers and/or aluminum phosphate sealing layers. In this regard, the boron-silicon-glass layer may form an exterior surface of the oxidation protection system.

Not to be bound by theory, it is believed that boron components may become oxidized during service at high temperatures (e.g., temperatures greater than 1300° F. (704° C.)), thereby forming boron trioxide. The boron trioxide may come into contact with oxidized silicon components to form a borosilicate in situ, providing a method of self-healing. The aluminum oxide and/or silicon dioxide from the pretreatment composition may also react with the boron trioxide, which may form in the boron-silicon-glass layer at elevated temperatures. The aluminum oxide and/or silicon dioxide reacting with the boron trioxide, tends to decrease or eliminate unreacted boron trioxide, thereby increasing the water stability of the oxidation protection system.

Figure 5:
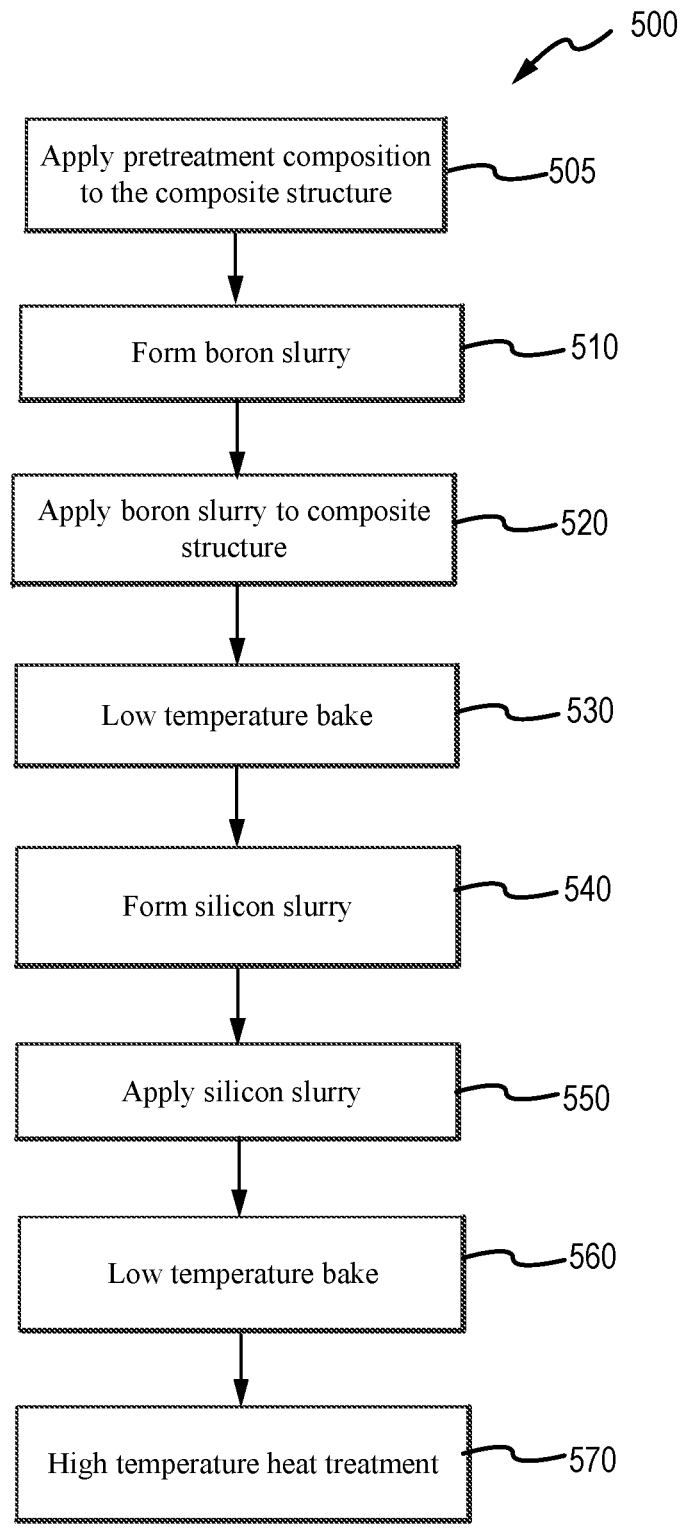
FIG. 5 illustrates a method for forming an oxidation protection system on a composite structure, in accordance with various embodiments.

With reference to FIG. 5, a method 500 for forming an oxidation protection system on composite structure is illustrated. In accordance with various embodiments, method 500 may, for example, comprise applying an oxidation inhibiting composition to non-wearing surfaces of carbon-carbon composite brake components, such as non-wear surfaces 45 and/or lugs 54 in FIG. 1A. The oxidation inhibiting composition of method 500 may be applied to preselected regions of a carbon-carbon composite structure that may be otherwise susceptible to oxidation. Method 500 may be performed on densified carbon-carbon composites. In this regard, method 500 may be performed after carbonization and densification of the carbon-carbon composite.

In various embodiments, method 500 may comprise applying a pretreatment composition to an outer surface of a composite structure (step 505). The composite structure may be a component of aircraft wheel braking assembly 10 in FIG. 1A. In various embodiments, the pretreatment composition comprises an aluminum oxide, a silicon dioxide, or combinations thereof in water. For example, the aluminum oxide may comprise a nanoparticle dispersion of aluminum oxide and/or a nanoparticle dispersion of silicon dioxide. The pretreatment composition may further comprise a surfactant or a wetting agent. In various embodiments, after applying the pretreatment composition, the composite structure is heated to remove water and fix the aluminum oxide and/or silicon dioxide in place. For example, the composite structure may be heated between about 100° C. (212° F.) and 200° C. (392° F.), between 100° C. (212° F.) and 150° C. (302° F.).

Method 500 may further includes forming a boron slurry (step 510) by combining a boron compound and a glass compound with a carrier fluid (such as, for example, water). In various embodiments, the boron compound may comprise at least one boron-comprising refractory material (e.g., ceramic materials). In various embodiments, the boron compound may comprise titanium diboride, boron nitride, boron carbide, zirconium boride, silicon hexaboride, and/or elemental boron. In various embodiments, the glass compound may comprise a borosilicate glass.

In various embodiments, the boron-silicon-glass composite slurry may comprise from 5% to 50% by weight boron compound, from 15% to 40% by weight boron compound, from 30% to 40% by weight boron compound, or about 35% by weight boron compound. As used in this context only, the term "about" means plus or minus 1 weight percent.

In various embodiments, the boron compound may comprise a boron compound powder (e.g., boron carbide powder) with particles having an average particle size as described previous with respect to method 200. In various embodiments, the boron compound may comprise particles of varying size. In various embodiments, the boron compound comprises a first group of particles having a first average particle size and a second group of particles having a second average particle size greater than the first average particle size.

In various embodiments, the particles of the first group may have an average particle size between 100 nm and 20 µm (between $3.9 \times 10^{-6}$ inch and 0.0008 inch), between 500 nm and 10 µm (between $2 \times 10^{-5}$ inch and 0.0004 inch), between 500 nm and 1.0 µm ($2 \times 10^{-5}$ inch and $3.9 \times 10^{-5}$ inch), or about 0.7 µm ($2.8 \times 10^{-5}$ inch). As used in this context only, the term "about" means plus or minus ten percent of the associated value.

In various embodiments, the particles of the second group may have an average particle size between 500 nm and 60 µm ($2 \times 10^{-5}$ inch and 0.0008 inch), 1 µm and 15 µm (between $2 \times 10^{-5}$ and 0.0006 inch), between 8 µm and 10.0 µm (between 0.0003 inch and 0.0008 inch), between 45 µm and 55 µm (between 0.0018 inch and 0.0022 inch), about 50 µm (0.0020 inch), and/or about 9.3 µm (0.00039 inch). As used in this context only, the term "about" means plus or minus ten percent of the associated value.

In various embodiments, the boron compound particles of the second average particle size form a larger weight percentage of the boron slurry as compared to the weight percentage formed by the boron compound particles of the first size. In various embodiments, the boron-silicon-glass composite slurry may comprise from 0% to 20% by weight the boron compound first average particle size, 5% to 15% by weight the boron compound first average particle size, or about 10.5% by weight the first boron compound average particle size. As used in this context only, the term "about" means plus or minus 0.5% weight percent. In various embodiments, the boron slurry may comprise from 5% to 50% by weight the second boron compound average particle size, 10% to 30% by weight the second boron compound average particle size, 20% to 25% by weight the second boron compound average particle size, or about 24.5% by weight the second boron compound average particle size. As used in this context only, the term "about" means plus or minus 0.5% weight percent.

In accordance with various embodiments, the glass compound of the boron slurry may be a borosilicate glass composition, borophosphate, quartz, aluminosilicate, boroaluminosilicate, and/or any other suitable glass compound, which may be in the form of a glass frit, powder, or other suitable pulverized form. In various embodiments, the borosilicate glass composition may comprise in weight percentage 13% $B_2O_3$, 61% $SiO_2$, 2% $Al_2O_3$, and 4% sodium oxide ($Na_2O$), and may have a CTE of $3.3 \times 10^{-6}$ cm/C, a working point of 2286° F. (1252° C.), and an annealing point of 1040° F. (560° C.).

In various embodiments, the boron-slurry may comprise from 1% to 35% by weight glass compound, from 5% to 15% by weight glass compound, or about 10% by weight glass compound. As used in this context only, the term "about" means plus or minus 0.5 weight percent.

In various embodiments, the glass compound comprises particles, the average particle size may be between 500 nm and 50 µm (between $3.9 \times 10^{-6}$ inch and 0.0039 inch), between 5 µm and 25 µm (between $2 \times 10^{-5}$ inch and 0.0039 inch), between 10 µm and 15 µm (between $2 \times 10^{-5}$ inch and $3.9 \times 10^{-5}$ inch), between 11.5 µm and 13 µm (between $3.9 \times 10^{-5}$ inch and 0.002 inch), or between about 12.3 µm (0.0004 inch). As used in this context only, the term "about" means plus or minus 0.5 weight percent.

In various embodiments, method 500 further comprises applying the boron slurry to a composite structure (step 520). Applying the boron slurry may comprise, for example, spraying or brushing the boron slurry to an outer surface of the composite structure. Any suitable manner of applying the boron-slurry to the composite structure is within the scope of the present disclosure. As referenced herein, the composite structure may refer to a carbon-carbon composite structure. The boron slurry may be applied over the aluminum oxide and/or silicon dioxide of the pretreatment composition.

In various embodiments, method 500 may further comprise performing a first low temperature bake (step 530). Step 530 may include heating the composite structure at a relatively low temperature (for example, a temperature of about 250° F. (121° C.) to about 350° F. (177° C.), or at about 300° F. (149° C.), wherein the term "about" in this context only means plus or minus 25° F. (4° C.)). Step 530 may include heating the composite structure for about 5 minutes to 8 hours, about 10 minutes to 2 hours, or about 1 hour, wherein the term "about" in this context only means plus or minus ten percent of the associated value.

In various embodiments, method 500 may comprise forming a silicon slurry (step 540) by combining a silicon compound and a glass compound with a carrier fluid (such as, for example, water). In various embodiments, the silicon compound may comprise silicon carbide, a silicide compound, silicon, silicon dioxide, and/or silicon carbonitride.

The weight percentage of the silicon compound within the silicon slurry may be any suitable weight percentage for the desired application. In various embodiments, the silicon slurry may comprise from 10% to 70% by weight silicon compound, from 20% to 55% by weight silicon compound, from 40% to 50% by weight silicon compound, or about 45% by weight silicon compound. As used in this context only, the term "about" means plus or minus 2 weight percent.

In various embodiments, the silicon compound may comprise a silicon compound powder (e.g., silicon carbide powder) including particles having an average particle size as described previously with respect to method 200. In various embodiments, the silicon compound may comprise silicon compound particles of varying size. In various embodiments, the silicon compound comprises a first group of silicon compound particles having a first average particle size and a second group of silicon compound particles having a second average particle size. The first silicon compound average particle size may be less than the second silicon compound average particle size.

In various embodiments, the silicon compound particles of the first group have an average particle size between 100 nm and 20 µm (between $3.9 \times 10^{-6}$ inch and 0.0008 inch), 500 nm and 10 µm (between $2 \times 10^{-5}$ and 0.0004 inch); between 500 nm and 1.5 µm (between $2 \times 10^{-5}$ and $6 \times 10^{-5}$), or about 1.0 µm ($4 \times 10^{-5}$ inch). In various embodiments, the silicon compound particles of the second group may have an average particle size between 1 µm and 50 µm (between $4 \times 10^{-5}$ inch and 0.002 inch), between 5 µm and 25 µm (between 0.0002 inch and 0.001), between 16 µm and 18 µm (between 0.0006 inch and 0.0007 inch), or about 17 µm (0.00067 inches). As used in this context only, the term "about" means plus or minus ten percent of the associated value.

In various embodiments, the silicon compound particles of the first average particle size form a larger weight percentage of the boron-silicon-glass composite slurry as compared to the weight percentage formed by the silicon compound particles of the second average particle size. In various embodiments, the silicon slurry may comprise from 0% to 30% by weight the second silicon compound average particle size, 0% to 20% by weight the second silicon compound average particle size, or about 13% by weight the second silicon compound average particle size. As used in this context only, the term "about" means plus or minus 1% weight percent. In various embodiments, the silicon slurry may comprise from 5% to 80% by weight the first silicon compound average particle size, 20% to 60% by weight the first silicon compound average particle size, 30% to 50% by weight the first silicon compound average particle size, about 31.5% by weight the second silicon compound average particle size, or about 45.0% by weight the second silicon compound average particle size. As used in this context only, the term "about" means plus or minus 1% weight percent.

In various embodiments, the glass compound of the silicon slurry may be a borosilicate glass composition, borophosphate, quartz, aluminosilicate, boroaluminosilicate, and/or any other suitable glass compound, which may be in the form of a glass frit, powder, or other suitable pulverized form. In various embodiments, the borosilicate glass composition may comprise in weight percentage 13% $B_2O_3$, 61% $SiO_2$, 2% $Al_2O_3$, and 4% sodium oxide ($Na_2O$), and may have a CTE of $3.3 \times 10^{-6}$ cm/C, a working point of 2286° F. (1252° C.), and an annealing point of 1040° F. (560° C.).

In various embodiments, the silicon slurry may comprise from 1% to 35% by weight glass compound, from 5% to 15% by weight glass compound, or about 10% by weight glass compound. As used in this context only, the term "about" means plus or minus 0.5 weight percent.

In various embodiments, the glass compound comprises particles having an average particle size of between 500 nm and 50 μm (between $3.9 \times 10^{-6}$ inch and 0.0039 inch), between 5 μm and 25 μm (between $2 \times 10^{-5}$ inch and 0.0039 inch), between 10 μm and 15 μm (between $2 \times 10^{-5}$ inch and $3.9 \times 10^{-5}$ inch), between 11.5 μm and 13 μm (between $3.9 \times 10^{-5}$ inch and 0.002 inch), or about 12.3 μm (0.0004 inch). As used in this context only, the term "about" means plus or minus 0.5 weight percent.

In various embodiments, method 500 further comprises applying the silicon slurry to the composite structure (step 550). The silicon slurry may be applied over the boron compound of the boron slurry and after the low temperature bake of step 530. In this regard, in various embodiments, the only heat treatment between application of the boron slurry (step 520) and the application of the silicon slurry (step 550) may be the first low temperature bake (step 530). Applying the silicon slurry may comprise, for example, spraying or brushing the silicon slurry over an outer surface of the composite structure. Any suitable manner of applying the silicon slurry to the composite structure is within the scope of the present disclosure. As referenced herein, the composite structure may refer to a carbon-carbon composite structure.

In various embodiments, method 500 may further comprise performing a second low temperature bake (step 560). Step 560 may include heating the composite structure at a relatively low temperature (for example, a temperature of about 250° F. (121° C.) to about 350° F. (177° C.), or at about 300° F. (149° C.), wherein the term "about" in this context only means plus or minus 25° F. (4° C.)). Step 560 may include heating the composite structure for about 5 minutes to 8 hours, about 10 minutes to 2 hours, or about 1 hour, wherein the term "about" in this context only means plus or minus ten percent of the associated value.

In various embodiments, method 500 may further comprise performing a high temperature heat treatment to form the boron layer and the silicon layer (step 570). Step 570 may include heating the composite structure at a relatively high temperature (for example, a temperature of about 1500° F. (816° C.) to about 1700° F. (927° C.), or at about 1650° F. (899° C.), wherein the term "about" in this context only means plus or minus 25° F. (4° C.)). Step 570 may include heating the composite structure for about 5 minutes to 8 hours, about 30 minutes to 5 hours, or about 2 hours, wherein the term "about" in this context only means plus or minus 10% of the associated value. Step 570 is performed after the second low temperature bake (step 560).

Not to be bound by theory, it is believed that boron components may become oxidized during service at high temperatures (e.g., temperatures greater than 1300° F. (704° C.)), thereby forming boron trioxide. The boron trioxide may come into contact with oxidized silicon components to form a borosilicate in situ, providing a method of self-healing. Method 500 tends to increase the probability of self-healing borosilicate formation by creating a layer of silicon compound by which boron trioxide must transport through prior to volatilization, reducing the dependence on aspect ratio and total amount of components in the slurry. Additionally, the aluminum oxide and/or silicon dioxide from the pretreatment composition may react with the boron trioxide. The aluminum oxide and/or silicon dioxide reacting with the boron trioxide, tends to decrease or eliminate unreacted boron trioxide, thereby increasing the water stability of the oxidation protection system. Further, locating the silicon layer (e.g., a silicon carbide layer) over the boron layer (e.g., a boron carbide layer), such that the boron layer is between the composite structure and the silicon layer tends to protect the boron layer, which may slow the rate of oxidation of boron within the boron layer.

Figure 6A:
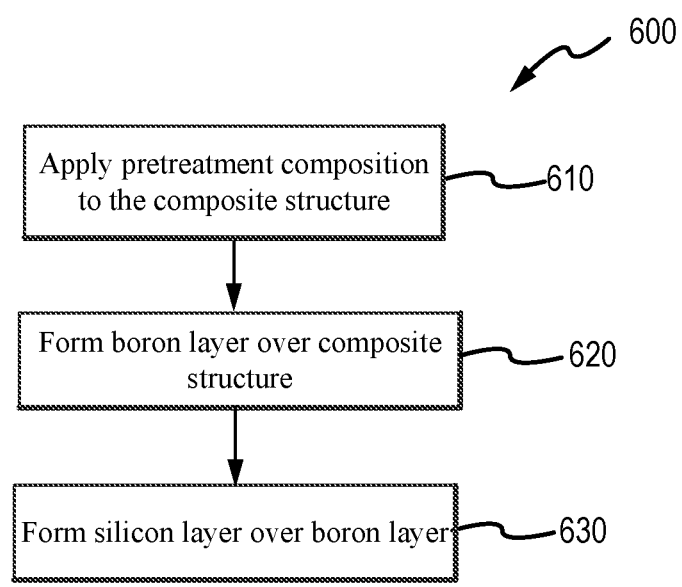
FIGS. 6A and 6B illustrate a method for forming an oxidation protection system on a composite structure, in accordance with various embodiments.

In various embodiments and with reference to FIG. 6A, a method 600 of forming an oxidation protection system on a composite structure is illustrated. In various embodiments, method 600 may comprise applying a pretreatment composition to the composite structure (step 610). Step 610 may, for example, comprise applying a pretreatment composition to an outer surface of a composite structure, such as a component of aircraft wheel braking assembly 10. In various embodiments, the pretreatment composition comprises an aluminum oxide, a silicon dioxide, or combinations thereof in water. For example, the aluminum oxide may comprise a nanoparticle dispersion of aluminum oxide (for example, NanoBYK-3600®, sold by BYK Additives & Instruments) and/or a nanoparticle dispersion of silicon dioxide. The pretreatment composition may further comprise a surfactant or a wetting agent. The composite structure may be porous, allowing the pretreatment composition to penetrate at least a portion of the pores of the composite structure. In various embodiments, after applying the pretreatment composition, the composite structure is heated to remove water and fix the aluminum oxide and/or silicon dioxide in place and thereby form a pretreatment layer comprised of aluminum oxide and/or silicon dioxide on the composite structure. The component may be heated between about 100° C. (212° F.) and 200° C. (392° F.) or between 100° C. (212° F.) and 150° C. (302° F.).

In accordance with various embodiments, method 600 may further include forming a boron layer over the composite structure (step 620) after applying the pretreatment composition. Step 620 may be performed after the water is removed from the pretreatment composition. In various embodiments, the boron layer may be formed using chemical vapor deposition (CVD). The boron layer comprises a boron compound. The boron compound may be at least one of titanium diboride, boron nitride, boron carbide, zirconium boride, silicon hexaboride, or elemental boron. In accordance with various embodiments, the pretreatment layer is located between the boron layer and the surface of the composite structure.

In accordance with various embodiments, method 600 may further include forming a silicon layer over the boron layer (step 630). In various embodiments, the silicon layer may be formed using CVD. The silicon layer comprises a silicon compound. The silicon compound may comprise silicon carbide, a silicide compound, silicon, silicon dioxide ($SiO_2$), or silicon carbonitride. In accordance with various embodiments, the boron layer is located between the pretreatment layer and the silicon layer. In various embodiments, the boron layer comprises boron carbide and the silicon layer comprises silicon carbide.

Not to be bound by theory, it is believed that the aluminum oxide and/or silicon dioxide from the pretreatment composition may react with the boron trioxide, which may form in the boron layer at elevated temperatures. The aluminum oxide and/or silicon dioxide reacting with the boron trioxide, tends to decrease or eliminate unreacted boron trioxide from the boron layer, thereby increasing the water stability of the boron layer. In addition, migration of free boron oxide to the wear surface is limited due to reaction with the pretreatment composition. Boric acid is a lubricant, therefore, it is desirable to eliminate any mobilization of such species to the wear surface. Further, locating the silicon layer over the boron layer tends to protect and/or form a barrier over the boron layer, which may slow the oxidation rate of boron within the boron layer.

Figure 6B:
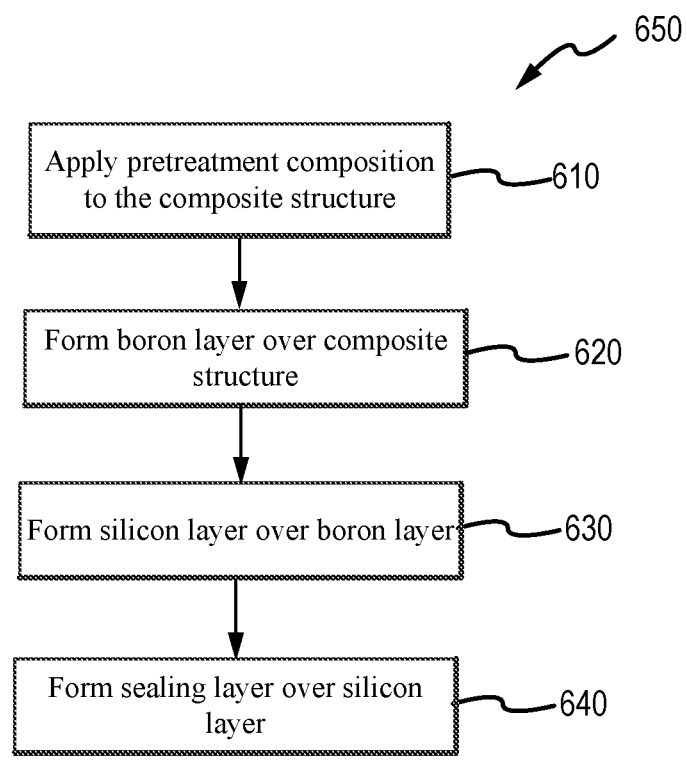

In various embodiments and with reference to FIG. 6B, a method 650 of forming an oxidation protection system on a composite structure is illustrated. In addition to steps 610, 620, and 630 from method 600 in FIG. 6A, method 650 may further comprise applying a sealing layer (step 640) on the silicon layer (i.e., after step 630). Step 640 may, for example, comprise forming a sealing slurry and applying the sealing slurry over the silicon layer. The sealing slurry may be in direct contact with the silicon layer. Applying the sealing slurry may comprise, for example, spraying or brushing the sealing slurry to the silicon layer. Any suitable manner of applying the slurry to the composite structure is within the scope of the present disclosure.

In various embodiments, the sealing slurry may comprise a monoaluminum phosphate solution and a carrier fluid (e.g., water). The monoaluminum phosphate solution may comprise any suitable make-up. In various embodiments, the monoaluminum phosphate solution may comprise about 50% by weight monoaluminum phosphate and about 50% by weight carrier fluid (e.g., water), wherein "about" as used in this context means plus or minus 40% by weight.

In various embodiments, the sealing slurry may further comprise phosphoric acid. In such embodiments, the sealing slurry may comprise about 10% to 30% by weight phosphoric acid, about 20% to 30% by weight phosphoric acid, about 20% by weight phosphoric acid, and/or about 25% by weight phosphoric acid ("about" used in this context means plus or minus 5% weight). In various embodiments, the sealing slurry may further comprise water and/or a surfactant. In such embodiments, the sealing slurry may comprise about 10% to 20% by weight water, about 15% to 20% by weight water, or about 19% by weight water ("about" used in this context means plus or minus 3% weight), and about 1% by weight surfactant ("about" used in this context means plus or minus 0.5% weight). The surfactant may comprise, for example, a silicon-based surfactant. In various embodiments, the sealing slurry may comprise about 25% by weight phosphoric acid and about 75% by weight monoaluminum phosphate solution, the monoaluminum phosphate solution being 50% by weight monoaluminum phosphate and 50% by weight water. In this context only, the term "about" means plus or minus 10% by weight. In various embodiments, the sealing slurry may comprise about 20% by weight phosphoric acid, about 20% by weight water, about 1% by weight silicon based surfactant, and about 60% by weight monoaluminum phosphate solution, the monoaluminum phosphate solution being 50% by weight monoaluminum phosphate and 50% by weight water. In this context only, the term "about" means plus or minus 10% by weight.

In various embodiments, the sealing slurry may be a phosphate glass sealing slurry comprising a pre-slurry composition and a carrier fluid (such as, for example, water). The pre-slurry composition may comprise a phosphate glass composition in glass frit or powder form. In various embodiments, the pre-slurry composition may further comprise ammonium dihydrogen phosphate (ADHP) and/or aluminum orthophosphate.

The phosphate glass composition may comprise and/or be combined with one or more alkali metal glass modifiers, one or more glass network modifiers and/or one or more additional glass formers. In various embodiments, boron oxide or a precursor may optionally be combined with the $P_2O_5$ mixture to form a borophosphate glass, which has improved self-healing properties at the operating temperatures typically seen in aircraft braking assemblies. In various embodiments, the phosphate glass and/or borophosphate glass may be characterized by the absence of an oxide of silicon. Further, the ratio of $P_2O_5$ to metal oxide in the fused glass may be in the range from about 0.25 to about 5 by weight.

The phosphate glass composition may be prepared by combining the above ingredients and heating them to a fusion temperature. In various embodiments, depending on the particular combination of elements, the fusion temperature may be in the range from about 700° C. (1292° F.) to about 1500° C. (2732° F.). The resultant melt may then be cooled and pulverized and/or ground to form a glass frit or powder. In various embodiments, the phosphate glass composition may be annealed to a rigid, friable state prior to being pulverized. Glass transition temperature (Tg), glass softening temperature (Ts) and glass melting temperature (Tm) may be increased by increasing refinement time and/or temperature. Before fusion, the phosphate glass composition comprises from about 20 mol % to about 80 mol % of $P_2O_5$. In various embodiments, the phosphate glass composition comprises from about 30 mol % to about 70 mol % $P_2O_5$, or precursor thereof. In various embodiments, the phosphate glass composition comprises from about 40 mol % to about 60 mol % of $P_2O_5$. In this context, the term "about" means plus or minus 5 mol %.

The phosphate glass composition may comprise, or be combined with, from about 5 mol % to about 50 mol % of the alkali metal oxide. In various embodiments, the phosphate glass composition may comprise, or be combined with, from about 10 mol % to about 40 mol % of the alkali metal oxide. Further, the phosphate glass composition may comprise, or be combined with, from about 15 mol % to about 30 mol % of the alkali metal oxide or one or more precursors thereof. In various embodiments, the phosphate glass composition may comprise, or be combined with, from about 0.5 mol % to about 50 mol % of one or more of the above-indicated glass formers. The phosphate glass composition may comprise, or be combined with, about 5 mol % to about 20 mol % of one or more of the above-indicated glass formers. As used herein, mol % is defined as the number of moles of a constituent per the total moles of the solution.

In various embodiments, the phosphate glass composition may be represented by the formula:

$$a(A'_2O)_x(P_2O_5)_{y1}b(G_fO)_{y2}c(A''O)_z \qquad [1]$$

In Formula 1, A' is selected from: lithium, sodium, potassium, rubidium, cesium, and mixtures thereof; $G_f$ is selected from: boron, silicon, sulfur, germanium, arsenic, antimony, and mixtures thereof; A" is selected from: vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, cadmium, and mixtures thereof; a is a number in the range from 1 to about 5; b is a number in the range from 0 to about 10; c is a number in the range from 0 to about 30; x is a number in the range from about 0.050 to about 0.500; y1 is a number in the range from about 0.100 to about 0.950; y2 is a number in the range from 0 to about 0.20; and z is a number in the range from about 0.01 to about 0.5; (x+y1+y2+z)=1; and x<(y1+y2). The phosphate glass composition may be formulated to balance the reactivity, durability, and flow of the resulting glass boron layer for optimal performance. As used in this context, the term "about" means plus or minus ten percent of the respective value.

The phosphate glass sealing slurry may comprise any suitable weight percentage phosphate glass composition. For example, the phosphate glass sealing slurry may comprise between 20% and 50% by weight phosphate glass composition, between 20% and 40% by weight phosphate glass composition, between 20% and 30% by weight phosphate glass composition, and/or between 30% and 40% by weight phosphate glass composition. The pre-slurry composition (and/or the resulting glass sealing layer) may comprise any suitable weight percentage of phosphate glass composition. For example, the pre-slurry composition may comprise between 50% and 95% by weight phosphate glass composition, between 60% and 90% by weight phosphate glass composition, and/or between 70% and 80% by weight phosphate glass composition.

In various embodiments, the sealing slurry may be a borosilicate glass sealing slurry comprising a borosilicate glass and a carrier fluid (e.g., water). In various embodiments, the borosilicate glass sealing slurry may comprise from 10% to 60% by weight borosilicate glass, from 20% to 50% by weight borosilicate glass, and/or from about 30% to 40% by weight borosilicate glass. In various embodiments, the borosilicate glass sealing slurry may comprise about 40% by weight borosilicate glass. In various embodiments, the borosilicate glass sealing slurry may comprise about 60% by weight water. In various embodiments, the borosilicate glass sealing slurry may comprise from 40% to 90% by weight water, from 50% to 80% by weight water, and/or from 60% to 70% by weight water. In various embodiments, the borosilicate glass sealing slurry may comprise about 40% by weight borosilicate glass and 60% by weight water. In this context, "about" means plus or minus 5% by weight. In various embodiments, the borosilicate glass comprised in the borosilicate glass sealing slurry may comprise any suitable borosilicate glass and/or any suitable composition.

In various embodiments, the borosilicate glass may comprise silicon dioxide ($SiO_2$), boron trioxide ($B_2O_3$), and/or aluminum oxide ($Al_2O_3$).

In various embodiments, step 640 may further comprise heating the composite structure to form a sealing layer from the sealing slurry (including, for example, forming a borosilicate and/or phosphate glass sealing layer from the borosilicate and/or phosphate glass sealing slurry). The composite structure may be heated to 200° C. (292° F.) to about 1000° C. (1832° F.). The composite structure may be heated at a temperature sufficient to adhere the sealing layer to the silicon layer by, for example, drying or baking the carbon-carbon composite structure at a temperature in the range from about 200° C. (392° F.) to about 1000° C. (1832° F.). In various embodiments, the composite structure is heated to a temperature in a range from about 600° C. (1112° F.) to about 1000° C. (1832° F.), or between about 200° C. (392° F.) to about 900° C. (1652° F.), or further, between about 400° C. (752° F.) to about 850° C. (1562° F.), wherein in this context only, the term "about" means plus or minus 10° C. Further, step 260 may, for example, comprise heating the composite structure for a period between about 0.5 hour and 3 hours, between about 0.5 hour and about 8 hours, or for about 2 hours, where the term "about" in this context only means plus or minus 0.25 hours.

In various embodiments, step 640 may comprise heating the composite structure to a first, lower temperature (for example, about 30° C. (86° F.) to about 300° C. (572° F.)) followed by heating at a second, higher temperature (for example, about 300° C. (572° F.) to about 1000° C. (1832° F.)). Further, step 640 may be performed in an inert environment, such as under a blanket of inert or less reactive gas (e.g., nitrogen, argon, other noble gases, and the like).

In various embodiments, the oxidation protection system may comprise one sealing layer comprising monoaluminum phosphate and phosphoric acid, and/or a borosilicate and/or phosphate glass sealing layer. In various embodiments, the oxidation protection system may comprise multiple sealing layers in any suitable layering order atop the silicon layer. For example, forming an oxidation protection system may comprise disposing a sealing layer comprising monoaluminum phosphate and phosphoric acid onto the composite structure (e.g., onto the silicon layer of the oxidation protection system), heating the composite structure to form a first phosphate sealing layer as described herein, disposing a second sealing slurry (e.g., a glass sealing slurry) onto the first phosphate sealing layer, and heating the composite structure as described herein to form a phosphate glass sealing layer. Either phosphate sealing layer in the previous example may be disposed first or second onto the silicon layer.

In various embodiments, step 640 may comprise applying a first sealing slurry to the silicon layer, heating the composite structure to a temperature sufficient to form a first sealing layer, applying a second sealing slurry to the first sealing layer, and heating the composite structure to a temperature sufficient to form a second sealing layer. In various embodiments, the first sealing slurry may comprise about 20% by weight phosphoric acid, about 20% by weight water, about 1% by weight silicon based surfactant, and about 60% by weight monoaluminum phosphate solution, the monoaluminum phosphate solution being 50% by weight monoaluminum phosphate and 50% by weight water. The second sealing slurry may comprise about 25% by weight phosphoric acid and about 75% by weight monoaluminum phosphate solution, the monoaluminum phosphate solution being 50% by weight monoaluminum phosphate and 50% by weight water. In this context only, the term "about" means plus or minus 10% by weight. In various embodiments, the sealing slurry may As will be appreciated by those skilled in the art, the silicon layer and/or the boron layer of the oxidation protection system may experience cracking during thermal oxidation. The effects of the cracking may be mitigated by adding sealing layer(s), for example, phosphate sealing layers and/or aluminum phosphate sealing layers, over the silicon layer.

Not to be bound by theory, it is believed that during operation, at elevated temperatures (e.g., around 1700° F. (927° C.) or 1800° F. (982° C.)), oxygen may diffuse and/or travel through cracks in the silicon layer and/or on the sealing layer(s) of the oxidation protection system and oxidize the boron compound in the boron layer into boron trioxide ($B_2O_3$). At elevated temperatures (e.g., around 1700° F. (927° C.) or 1800° F. (982° C.)), the silicon compound in the silicon layer may also react (e.g., oxidize) to form silica. The silica may react with the boron trioxide to form borosilicate glass. The borosilicate glass may be formed in the cracks in the silicon layer and/or sealing layer(s), and/or flow into cracks formed in the silicon layer and/or sealing layer(s). Therefore, the oxidation protection systems described herein have self-healing properties to protect against cracks formed in the layers of the oxidation protection systems, preventing, or mitigating against oxygen penetration and the resulting oxidation and loss of material. Further, the aluminum oxide and/or silicon dioxide from the pretreatment composition may react with the boron trioxide, which may form in the boron layer at elevated temperatures. The aluminum oxide and/or silicon dioxide reacting with the boron trioxide, tends to decrease or eliminate unreacted boron trioxide from the boron layer, thereby increasing the water stability of the oxidation protection system. In addition, migration of free boron oxide to the wear surface is limited due to reaction with the pretreatment composition. Boric acid is a lubricant; thus, it is desirable to eliminate any mobilization of such species to the wear surface.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for forming an oxidation protection system on a composite structure, comprising:
   applying a composite slurry to the composite structure, wherein the composite slurry comprises boron carbide, silicon carbide, borosilicate glass, an oxygen reactant compound including a silica forming component, and a carrier fluid, and wherein the oxygen reactant compound is between 1.0% and 10.0% of a dry weight of the composite slurry, the composite slurry comprises from 10% to 40% by weight the boron carbide, the oxygen reactant compound comprises particles having an average particle size of between 20 nm and 20 µm, the boron carbide comprises a boron compound powder comprising particles having an average particle size between 100 nm and 100 µm, and the silicon carbide comprises a silicon carbide powder comprising particles having an average particle size of between 500 nm and 20 µm, and the composite slurry is substantially free of phosphate; and
   heating the composite structure to a temperature sufficient to form a boron-silicon-glass-oxygen reactant layer on the composite structure.

2. The method of claim 1, wherein the oxygen reactant compound comprises silicon dioxide.

3. The method of claim 2, further comprising applying a pretreatment composition to the composite structure between an outer surface of the composite structure and the composite slurry, the pretreatment composition comprising at least one of aluminum oxide or silicon dioxide.

4. The method of claim 2, further comprising applying a pretreatment composition to the composite structure between an outer surface of the composite structure and the composite slurry, the pretreatment composition comprising silicon dioxide.

5. The method of claim 2, wherein the composite slurry comprises about 21.1% by weight boron carbide having an average particle size of about 9.3 µm (0.0004 inch), about 27.1% by weight silicon carbide having an average particle size of about 1 µm ($4 \times 10^{-5}$ inch), about 18.1% by weight borosilicate glass having an average particle size of about 12.3 µm (0.0005 inch), between about 0.5% and 0.6% by weight silicon dioxide, and about 33.2% by weight water;

the borosilicate glass being comprised, in weight percentage of the borosilicate glass, of about 13% $B_2O_3$, about 61% $SiO_2$, about 2% $Al_2O_3$, and about 4% $Na_2O$.

6. The method of claim 1, wherein a composition of the borosilicate glass comprises in weight percentage 13% $B_2O_3$, 61% $SiO_2$, 2% $Al_2O_3$, and 4% sodium oxide ($Na_2O$).

7. The method of claim 1, wherein the heating the composite structure to the temperature sufficient to form a boron-silicon-glass-oxygen reactant layer on the composite structure includes:
performing a first temperature bake by heating the composite structure at a first temperature, and
subsequent to performing the low temperature bake, performing a second temperature bake by heating the composite structure at a second temperature that is greater than the first temperature, the first temperature is between about 150° F. and about 250° F., and the second temperature is between about 1600° F. and about 1700° F.

8. The method of claim 7, wherein the first temperature bake is performed for between 10 minutes to 30 minutes and the second temperature bake is performed for between 1.5 hours to about 2.5 hours.

9. The method of claim 1, wherein the silica forming component comprises at least one of SiO2, silicon, silicon carbide, silicon oxycarbide (SiOC), a silicate, or an organo-silicate.

10. The method of claim 1, wherein the oxygen reactant compound comprises particles having an average particle size of between 30 nm and 10 μm.

11. The method of claim 1, wherein the oxygen reactant compound comprises particles having an average particle size of between 30 nm and 2.0 μm.

12. The method of claim 1, wherein the boron carbide powder comprises a first group of particles having a first average particle size and a second group of particles having a second average particle size greater than the first average particle size.

* * * * *